US012610235B2

(12) United States Patent
Wang et al.

(10) Patent No.: US 12,610,235 B2
(45) Date of Patent: Apr. 21, 2026

(54) METHOD AND APPARATUS FOR PROVISIONING OF LOCALIZED TEMPORARY SERVICES (LTS) HOSTING NETWORK CREDENTIALS

(71) Applicant: InterDigital Patent Holdings, Inc., Wilmington, DE (US)

(72) Inventors: Guanzhou Wang, Brossard (CA); Saad Ahmad, Montreal (CA); Alec Brusilovsky, Downingtown, PA (US); Ulises Olvera-Hernandez, Saint-Lazare (CA); Xiaoyan Shi, Lake Oswego, OR (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 326 days.

(21) Appl. No.: 18/034,838

(22) PCT Filed: Nov. 2, 2021

(86) PCT No.: PCT/US2021/057734
§ 371 (c)(1),
(2) Date: May 1, 2023

(87) PCT Pub. No.: WO2022/094469
PCT Pub. Date: May 5, 2022

(65) Prior Publication Data
US 2023/0413049 A1 Dec. 21, 2023

Related U.S. Application Data

(60) Provisional application No. 63/230,383, filed on Aug. 6, 2021, provisional application No. 63/108,539, filed on Nov. 2, 2020.

(51) Int. Cl.
H04W 12/06 (2021.01)
H04W 8/24 (2009.01)
H04W 60/00 (2009.01)

(52) U.S. Cl.
CPC ........... H04W 12/068 (2021.01); H04W 8/24 (2013.01); H04W 60/00 (2013.01)

(58) Field of Classification Search
CPC ..... H04W 12/068; H04W 8/24; H04W 60/00; H04W 4/021; H04W 8/02; H04W 84/10;
(Continued)

(56) References Cited

U.S. PATENT DOCUMENTS

| 6,370,449 | B1 * | 4/2002 | Razavi | ................ H04L 61/4541 |
| | | | | 701/32.7 |
| 7,181,511 | B1 * | 2/2007 | Grenier | ................... H04L 67/51 |
| | | | | 709/200 |

(Continued)

FOREIGN PATENT DOCUMENTS

| EP | 3589000 A1 | 1/2020 |
| WO | WO 2018005128 A1 | 1/2018 |

OTHER PUBLICATIONS

Third Generation Partnership Project (3GPP), "Study on 5G Networks Providing Access to Localized Services", 3GPP Tdoc SP-200799, 3GPP TSG SA Meeting 89e, Electronic meeting, Sep. 15, 2020, 3 pages.

(Continued)

*Primary Examiner* — Aravind K Moorthy
(74) *Attorney, Agent, or Firm* — Volpe Koenig

(57) ABSTRACT

A method implemented in a wireless transmit/receive unit (WTRU) of provisioning the WTRU for communication in a temporary local network includes transmitting, to an onboarding network, information regarding a capability of the WTRU to communicate with the temporary local net-
(Continued)

work. Configuration information for temporary local network provisioning is received from the onboarding network. A message identifying a provisioning configuration for use by the WTRU with the temporary local network is received from the onboarding network, using the received configuration information. A message is sent to the temporary local network using the provisioning configuration.

10 Claims, 17 Drawing Sheets

(58) Field of Classification Search
CPC ... H04W 4/50; H04W 48/16; H04W 12/0431; H04L 67/02; H04L 67/12; H04L 69/22; H04L 69/24; H04L 67/14
See application file for complete search history.

(56) References Cited

U.S. PATENT DOCUMENTS

| | | | | |
|---|---|---|---|---|
| 8,707,402 | B1* | 4/2014 | Worsley | G06F 9/4416 |
| | | | | 726/4 |
| 9,064,117 | B1* | 6/2015 | Worsley | G06F 9/441 |
| 9,191,275 | B1* | 11/2015 | Worsley | H04L 41/0803 |
| 10,021,557 | B1* | 7/2018 | Mathison | H04W 12/35 |
| 10,419,908 | B1 | 9/2019 | Hutz et al. | |
| 11,109,220 | B1* | 8/2021 | Shah | G06F 21/44 |
| 11,301,799 | B1* | 4/2022 | Coutand | G06Q 10/0833 |
| 11,445,402 | B1* | 9/2022 | Saha | H04W 24/10 |
| 2004/0006591 | A1* | 1/2004 | Matsui | H04L 67/564 |
| | | | | 709/203 |
| 2004/0022226 | A1* | 2/2004 | Edlund | H04W 48/14 |
| | | | | 370/328 |
| 2004/0167987 | A1* | 8/2004 | Reese | G06F 9/54 |
| | | | | 709/227 |
| 2010/0185770 | A1* | 7/2010 | Hehmeyer | H04L 67/54 |
| | | | | 709/227 |
| 2011/0161659 | A1* | 6/2011 | Himawan | H04L 9/3263 |
| | | | | 713/156 |
| 2012/0151353 | A1* | 6/2012 | Joanny | G06F 3/0481 |
| | | | | 715/735 |
| 2013/0124725 | A1* | 5/2013 | Buerk | H04L 61/5014 |
| | | | | 709/224 |
| 2013/0208644 | A1* | 8/2013 | Jung | H04W 4/08 |
| | | | | 370/312 |
| 2014/0204803 | A1* | 7/2014 | Nguyen | H04L 41/5054 |
| | | | | 370/255 |
| 2014/0281493 | A1* | 9/2014 | Nakhjiri | H04L 9/321 |
| | | | | 713/155 |
| 2015/0100658 | A1* | 4/2015 | Lieberman | G06F 3/1454 |
| | | | | 709/208 |
| 2015/0121470 | A1* | 4/2015 | Rongo | H04W 12/50 |
| | | | | 726/4 |
| 2015/0244708 | A1* | 8/2015 | Ballard | H04L 63/0823 |
| | | | | 726/6 |
| 2015/0264561 | A1* | 9/2015 | Lee | H04W 8/22 |
| | | | | 455/435.1 |
| 2015/0317467 | A1* | 11/2015 | Rattner | H04W 12/35 |
| | | | | 726/5 |
| 2016/0119824 | A1* | 4/2016 | Jin | H04W 36/00224 |
| | | | | 455/436 |
| 2016/0364553 | A1* | 12/2016 | Smith | H04L 63/0435 |
| 2016/0364787 | A1* | 12/2016 | Walker | H04L 9/0891 |
| 2016/0366141 | A1* | 12/2016 | Smith | H04L 41/12 |
| 2017/0071021 | A1* | 3/2017 | Jin | H04W 76/15 |
| 2017/0171102 | A1* | 6/2017 | Parker | H04L 12/4641 |
| 2017/0240137 | A1* | 8/2017 | Morgan | B60R 25/1012 |
| 2017/0280439 | A1* | 9/2017 | Zhang | H04W 24/02 |
| 2017/0288786 | A1* | 10/2017 | Al-Mousa | H04B 11/00 |
| 2017/0367026 | A1* | 12/2017 | Li | H04L 41/0816 |
| 2018/0027476 | A1* | 1/2018 | Lei | H04W 40/246 |
| | | | | 455/419 |
| 2018/0341520 | A1* | 11/2018 | Zhu | H04L 41/50 |
| 2019/0045207 | A1* | 2/2019 | Chen | G06N 3/08 |
| 2019/0081936 | A1* | 3/2019 | Sayers | H04L 9/0891 |
| 2019/0082288 | A1* | 3/2019 | Kumar | H04W 64/00 |
| 2019/0090080 | A1* | 3/2019 | Rathineswaran | H04L 67/125 |
| 2019/0090122 | A1* | 3/2019 | Palnati | H04W 8/14 |
| 2019/0104134 | A1* | 4/2019 | Lee | H04W 12/10 |
| 2019/0253917 | A1* | 8/2019 | Dao | H04W 76/27 |
| 2019/0280920 | A1* | 9/2019 | Wang | H04L 69/22 |
| 2019/0296979 | A1* | 9/2019 | Gupta | G06N 3/08 |
| 2019/0342761 | A1* | 11/2019 | Yu | H04W 60/00 |
| 2019/0349881 | A1* | 11/2019 | Choi | H04W 4/02 |
| 2019/0357198 | A1* | 11/2019 | Xiong | H04W 72/51 |
| 2020/0014523 | A1* | 1/2020 | Huang | H04L 5/001 |
| 2020/0076896 | A1* | 3/2020 | Anumala | H04W 4/70 |
| 2020/0128370 | A1* | 4/2020 | Mesirow | H04W 4/02 |
| 2020/0142731 | A1* | 5/2020 | Dunnings | G06F 11/2023 |
| 2020/0205207 | A1* | 6/2020 | Harrington | H04W 12/40 |
| 2020/0221302 | A1* | 7/2020 | Filart | H04L 65/1104 |
| 2020/0233651 | A1* | 7/2020 | Shantharam | G06F 8/65 |
| 2020/0344606 | A1* | 10/2020 | Zaus | H04W 8/18 |
| 2020/0359212 | A1* | 11/2020 | Chen | H04L 63/102 |
| 2020/0403875 | A1* | 12/2020 | Rooney | H04W 12/04 |
| 2020/0404106 | A1* | 12/2020 | Belling | H04W 8/10 |
| 2021/0036929 | A1* | 2/2021 | Kesavan | G06F 9/44505 |
| 2021/0037150 | A1* | 2/2021 | Nagae | G06F 3/1287 |
| 2021/0037607 | A1* | 2/2021 | Hamidi-Sepehr | H04W 24/08 |
| 2021/0126828 | A1* | 4/2021 | Vidyashankar | H04L 41/0856 |
| 2021/0136563 | A1* | 5/2021 | Chandrasekaran | H04W 12/50 |
| 2021/0185557 | A1* | 6/2021 | Essigmann | H04W 28/0273 |
| 2021/0203527 | A1* | 7/2021 | Strater | H04W 24/02 |
| 2021/0224080 | A1* | 7/2021 | Krishnakumar | G06F 9/4401 |
| 2021/0275028 | A1* | 9/2021 | Kumar | A61B 5/4552 |
| 2021/0306842 | A1* | 9/2021 | Rivas Molina | H04L 67/51 |
| 2021/0345067 | A1* | 11/2021 | Zhang | H04W 4/20 |
| 2022/0045944 | A1* | 2/2022 | Sun | H04L 5/0091 |
| 2022/0086632 | A1* | 3/2022 | Wang | H04L 63/0869 |
| 2022/0131945 | A1* | 4/2022 | Sapra | H04L 67/51 |
| 2022/0132303 | A1* | 4/2022 | Viswanathan | H04L 63/0876 |
| 2022/0159651 | A1* | 5/2022 | Chatterjee | H04W 72/0446 |
| 2022/0303918 | A1* | 9/2022 | Sun | H04B 7/0404 |
| 2022/0311564 | A1* | 9/2022 | Sun | H04W 8/24 |
| 2022/0394683 | A1* | 12/2022 | Palenius | H04W 48/08 |
| 2023/0107045 | A1* | 4/2023 | Shet | G16Y 30/10 |
| | | | | 726/4 |
| 2023/0164538 | A1* | 5/2023 | Zhu | H04W 8/18 |
| | | | | 455/414.1 |
| 2023/0262526 | A1* | 8/2023 | Yuan | H04L 5/0057 |
| | | | | 455/422.1 |
| 2024/0031075 | A1* | 1/2024 | Yao | H04L 1/1854 |
| 2024/0147240 | A1* | 5/2024 | Boyapalle | H04W 12/06 |
| 2024/0284317 | A1* | 8/2024 | Barton | H04W 48/18 |

OTHER PUBLICATIONS

Third Generation Partnership Project (3GPP), "Technical Specification Group Services and System Aspects, System Architecture for the 5G System (5GS); Stage 2, (Release 17)", 3GPP TS 23.501 V17.1.1, Jun. 2021, 526 pages.

European Telecommunications Standards Institute (ETSI), "5G; System Architecture for the 5G System (5GS) (3GPP TS 236.501 version 16.6.0 Release 16)", ETSI TS 123 501 V16.6.0, Oct. 2020, 450 pages.

Third Generation Partnership Project (3GPP), "Technical Specification Group Services and System Aspects, Procedures for the 5G System (5GS); Stage 2 (Release 17)", 3GPP TS 23.502 V17.1.0, Jun. 2021, 692 pages.

European Telecommunications Standards Institute (ETSI), "5G; 5G System (5GS) Location Services (LCS); Stage 2 (3GPP TS 23.273 version 16.4.0 Release 16)", ETSI TS 123 273 V16.4.0, Jul. 2020, 98 pages.

European Telecommunications Standards Institute (ETSI), "Digital Cellular Telecommunications System (Phase 2+) (GSM); Universal Mobile Telecommunications Systems (UMTS); LTE; 5G; Non-Access-Stratum (NAS) functions related to Mobile Station (MS) in idle mode (3GPP TS 23.122 version 16.7.0 Release 16)", ETSI TS 23.122 V16.7.0, Oct. 2020, 86 pages.

(56)          References Cited

OTHER PUBLICATIONS

European Telecommunications Standards Institute (ETSI), "5G;
Procedures for the 5G System (5GS) (3GPP TS 23.502 version
16.6.0 Release 16)", ETSI TS 123 502 V16.6.0, Oct. 2020, 600
pages.

* cited by examiner

METHOD AND APPARATUS FOR PROVISIONING OF LOCALIZED TEMPORARY SERVICES (LTS) HOSTING NETWORK CREDENTIALS

CROSS-REFERENCE TO RELATED APPLICATIONS

This application is a U.S. National Stage Application under 35 U.S.C. § 371 of International Patent Application No. PCT/US2021/057734, filed Nov. 2, 2021, which claims the benefit of U.S. Patent Application No. 63/108,539, filed Nov. 2, 2020, and 63/230,383, filed Aug. 6, 2021, each of which is incorporated herein by reference in its entirety.

BACKGROUND

In certain circumstances, a small cellular network may be deployed to provide services to local users within a certain area. For example, a temporary non-public cellular network may be set up to provide streaming video service to the audience in a live concert or at a football match. As another example, in places like airports, shopping malls and school campuses where a crowd may gather, small cellular networks may be deployed to provide localized services, such as commercial ads in the shopping mall or on-demand services in a movie theatre. The services provided by these cellular networks have two basic characteristics: i) the services are localized, in the sense that they are related to activities and/or events in a certain location or area, and they are usually available only to the users at the location or within the area; and ii) users typically do not utilize these services on a regular basis but most likely in an on-demand or temporary fashion. Therefore, such services can be referred to as Localized Temporary Services (LTS).

Cellular networks that provide LTS are referred to as LTS Hosting Networks. A hosting network may be a temporary network, meaning that it may have been set up temporarily for an event and then dismantled after the event is over, but it can also be a long-term network, such as that deployed in a shopping mall or on a university campus.

A hosting network may be a Non-Public Network (NPN) or it may be a part of a Public Land Mobile Network (PLMN) (e.g. created using a network slice inside a PLMN, i.e. Public Network Integrated (PNI)-NPN). The operator of the hosting network may be a PLMN operator (even if the hosting network itself is a NPN), or a NPN operator. The services may be provided by a Service Provider (SP) that could be the hosting network operator itself or a third-party SP.

FIGS. 2A-2C illustrate various deployment possibilities for LTS Hosting Networks. In FIG. 2A, the hosting network is a NPN and it is operated by a PLMN operator while the services are provided by a third-party SP. In FIG. 2B, the hosting network is a NPN and it is operated by a NPN operator different from the PLMN operator. The service provider could be the NPN operator itself or a third-party SP. In FIG. 2C, the hosting network is a PNI-NPN and it is operated by the same PLMN operator, while the services are provided by a third-party SP.

An important aspect of LTS is that potential service users do not have a subscription or credentials for accessing the temporary hosting network. Nor do they have any configurations for discovering or selecting the hosting network or for setting up connections in the network. This aspect also makes it different from other local services provided within a PLMN, such as Local Area Data Network (LADN) defined in 3GPP.

SUMMARY

In an aspect, the present principles are directed to a method, implemented in a wireless transmit/receive unit, WTRU, of provisioning the WTRU for communication in a temporary local network, the method including transmitting, to an onboarding network, information regarding a capability of the WTRU to interact with the temporary local network, receiving, from the onboarding network, configuration information for temporary local network provisioning, receiving, from the onboarding network, using the received configuration information, a message identifying a provisioning configuration for use by the WTRU with the temporary local network, and interacting, using the provisioning configuration, with the temporary local network.

In another aspect, the present principles are directed to a wireless transmit/receive unit, WTRU, including memory configured to store program code instructions and at least one hardware processor configured to execute the program code instructions to transmit, to an onboarding network, information regarding a capability of the WTRU to interact with the temporary local network, receive, from the onboarding network, configuration information for temporary local network provisioning, receive, from the onboarding network, using the received configuration information, a message identifying a provisioning configuration for use by the WTRU with the temporary local network, and interact, using the provisioning configuration, with the temporary local network.

In yet another aspect, the present principles are directed to a method, performed by a network function in a first network, including monitoring subscription request events in a second network, upon detection of a subscription request event from a wireless transmit/receive unit, WTRU, creating temporary credentials for the WTRU, and delivering the temporary credentials for the WTRU to the WTRU.

In yet another aspect, the present principles are directed to a network function including memory configured to store program code instructions and at least one processor configured to execute the program code instructions to monitor, in a first network, subscription request events in a second network, upon detection of a subscription request event from a wireless transmit/receive unit, WTRU, create temporary credentials for the WTRU, and deliver the temporary credentials for the WTRU to the WTRU.

BRIEF DESCRIPTION OF THE DRAWINGS

Furthermore, like reference numerals in the figures indicate like elements, and wherein.

EXAMPLE NETWORKS FOR IMPLEMENTATION OF THE EMBODIMENTS

Figure 1A:
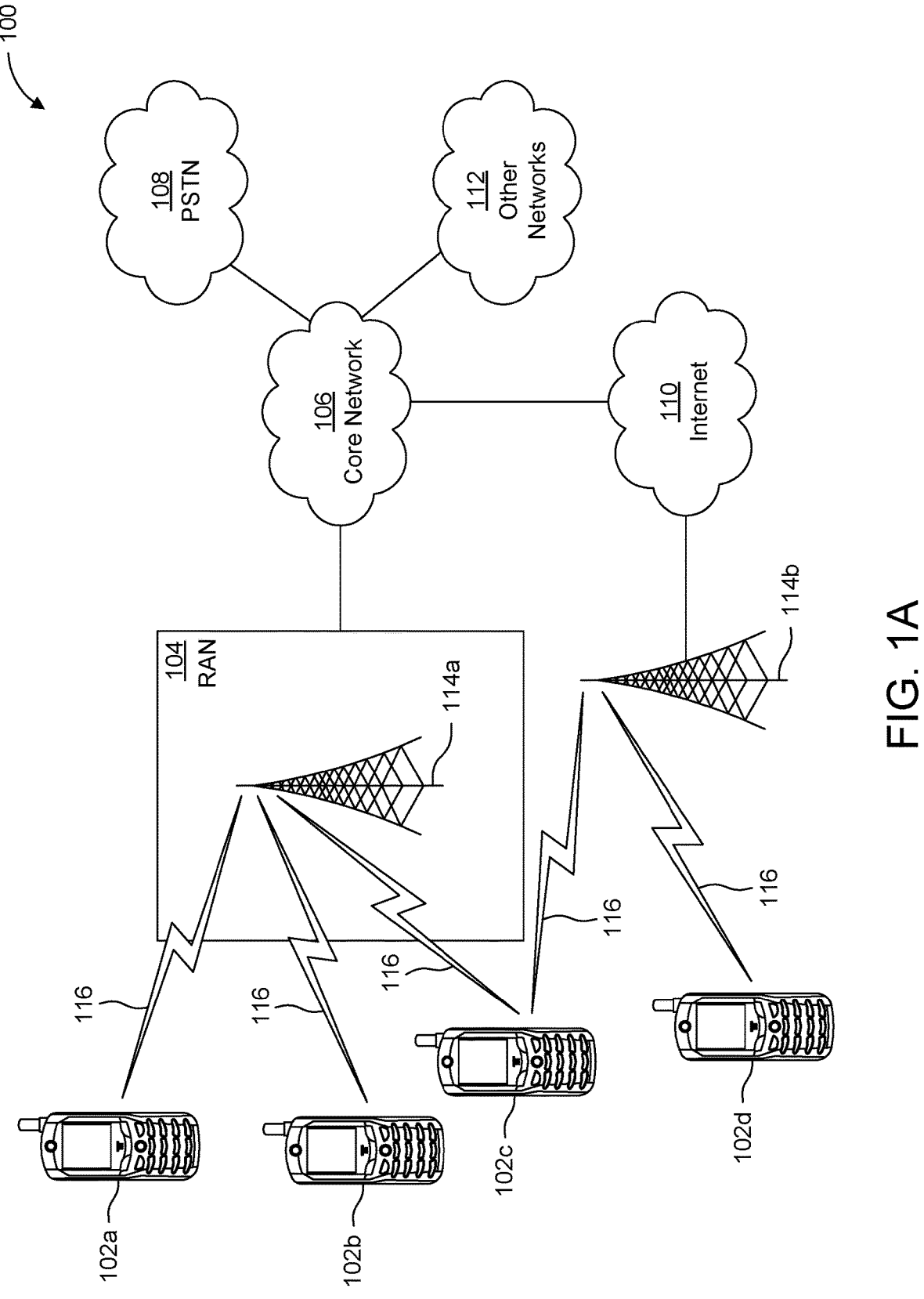
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a in the RAN 104 and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a in the RAN 104 and the WTRUs 102a, 102b, 102c may implement a radio technology such as NR Radio Access, which may establish the air interface 116 using New Radio (NR).

In an embodiment, the base station 114a in the RAN 104 and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The other networks 112 may include wired and/or wireless communications networks owned and/or operated by other service providers. For example, the other networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
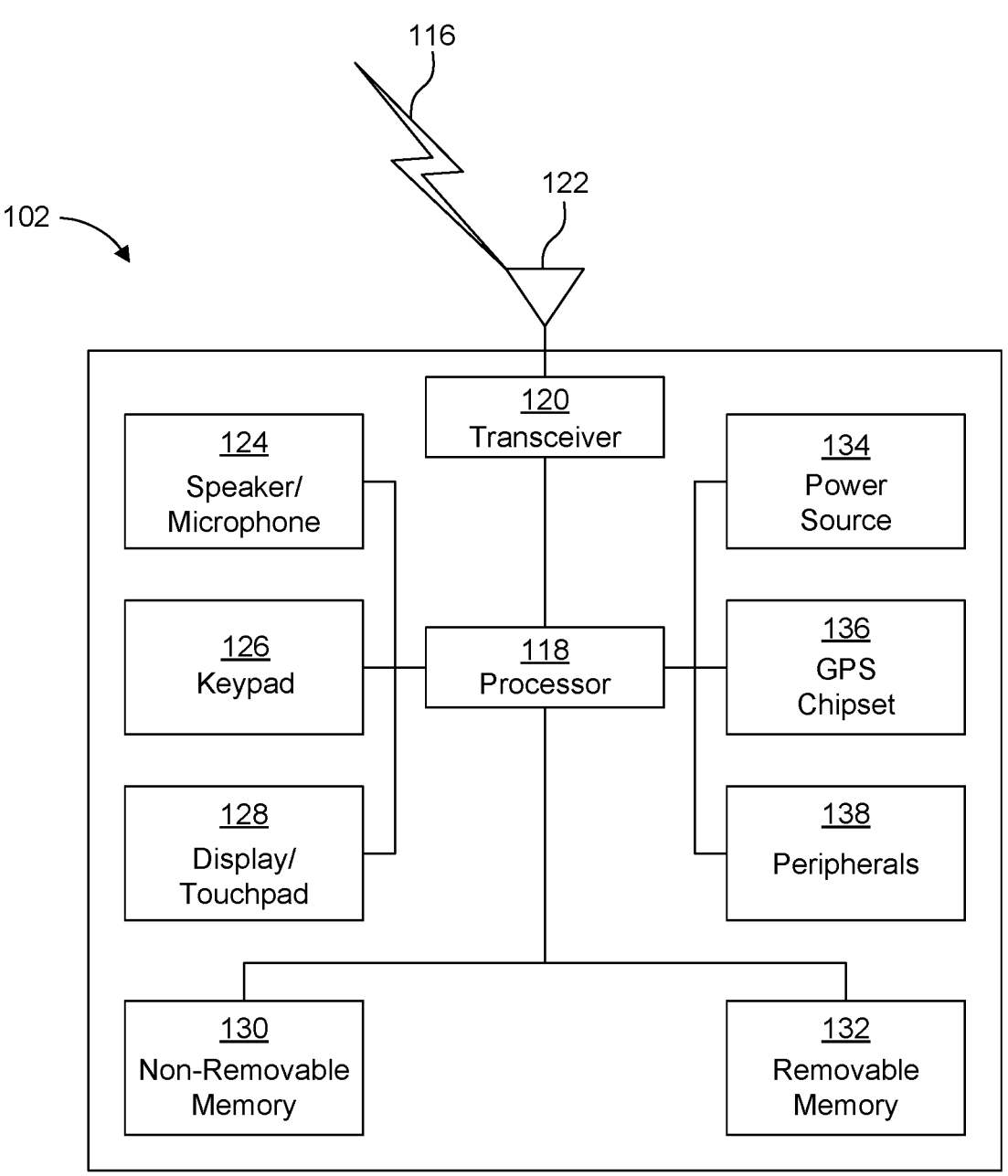
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a chipset 136 for a positioning system such as Global Positioning System (GPS), and/or other elements 138, among others. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a in FIG. 1A) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ M IMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements 138, which may include one or more software and/or hardware modules that provide additional features, functionality and/or wired or wireless connectivity. For example, the elements 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The elements 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
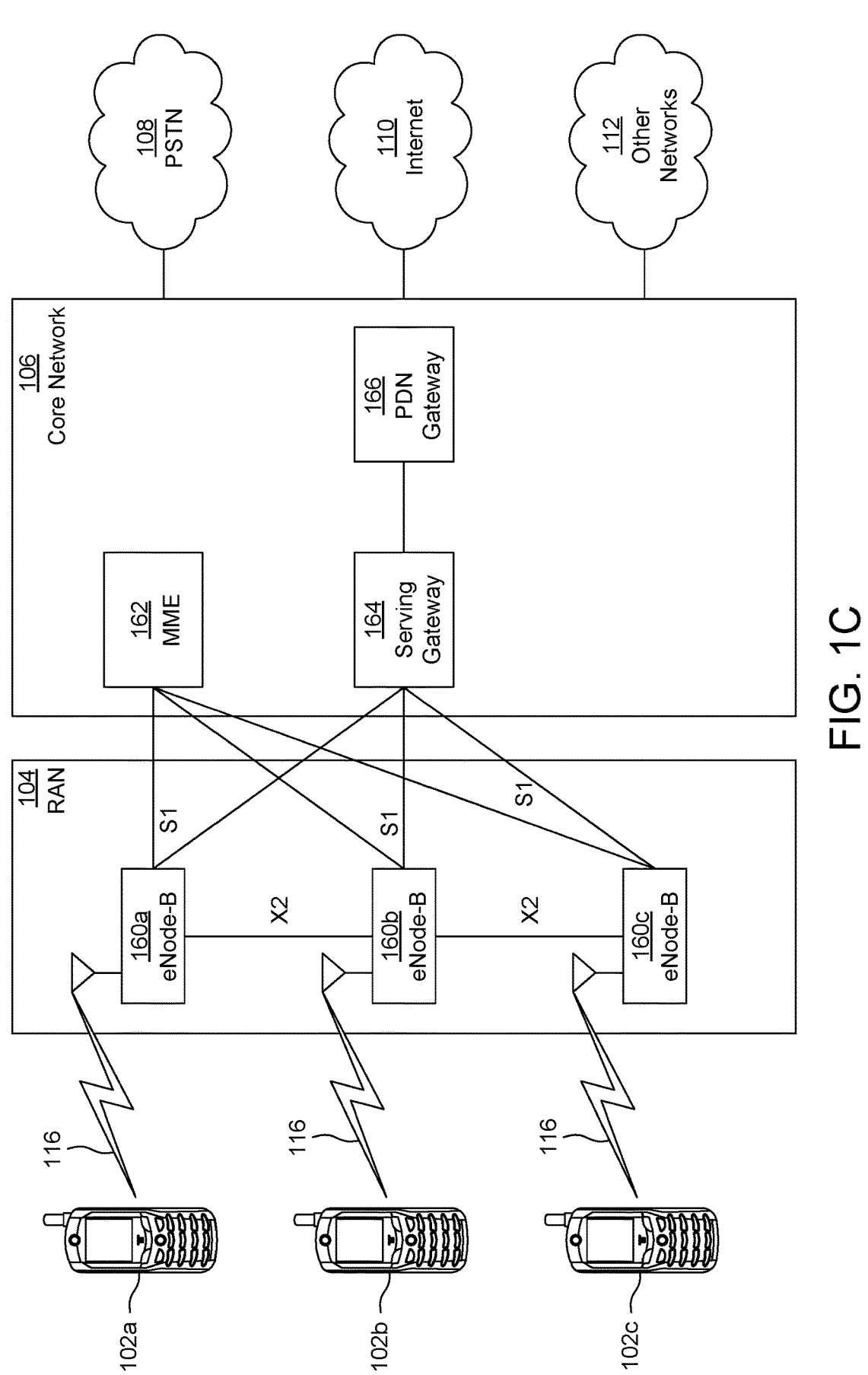
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz.

In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
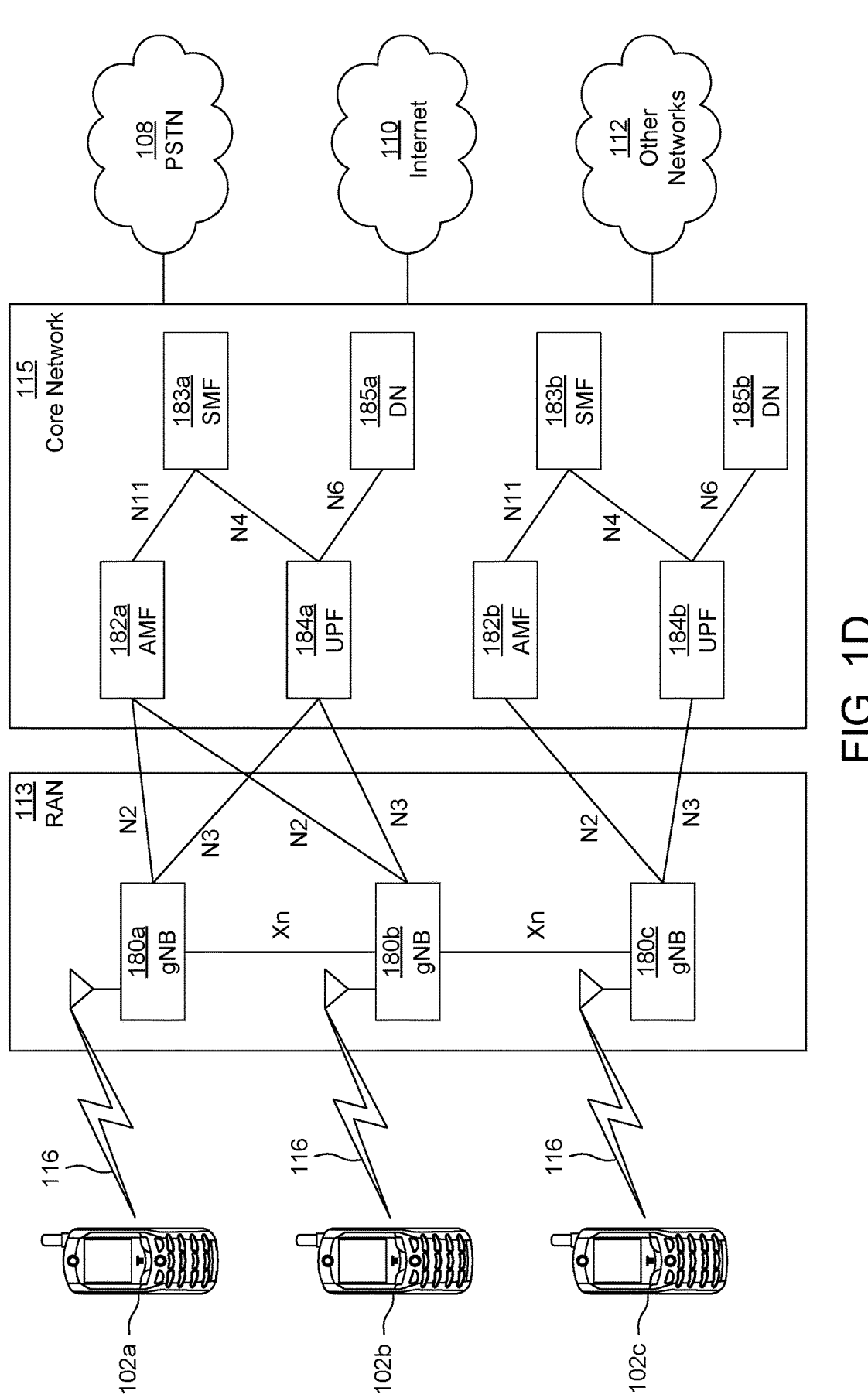
FIG. 1D is a system diagram illustrating a further example RAN and a further example CN that may be used within the communications system illustrated in FIG. 1A according to an embodiment.
Figure 2A:
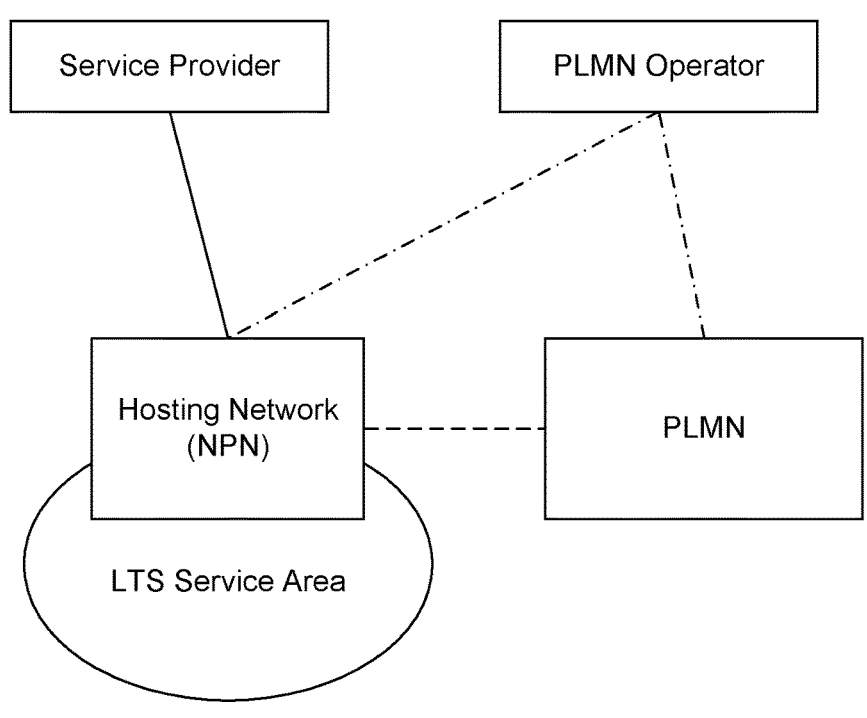
FIGS. 2A-2C illustrate various deployment possibilities for LTS Hosting Networks.
Figure 2B:
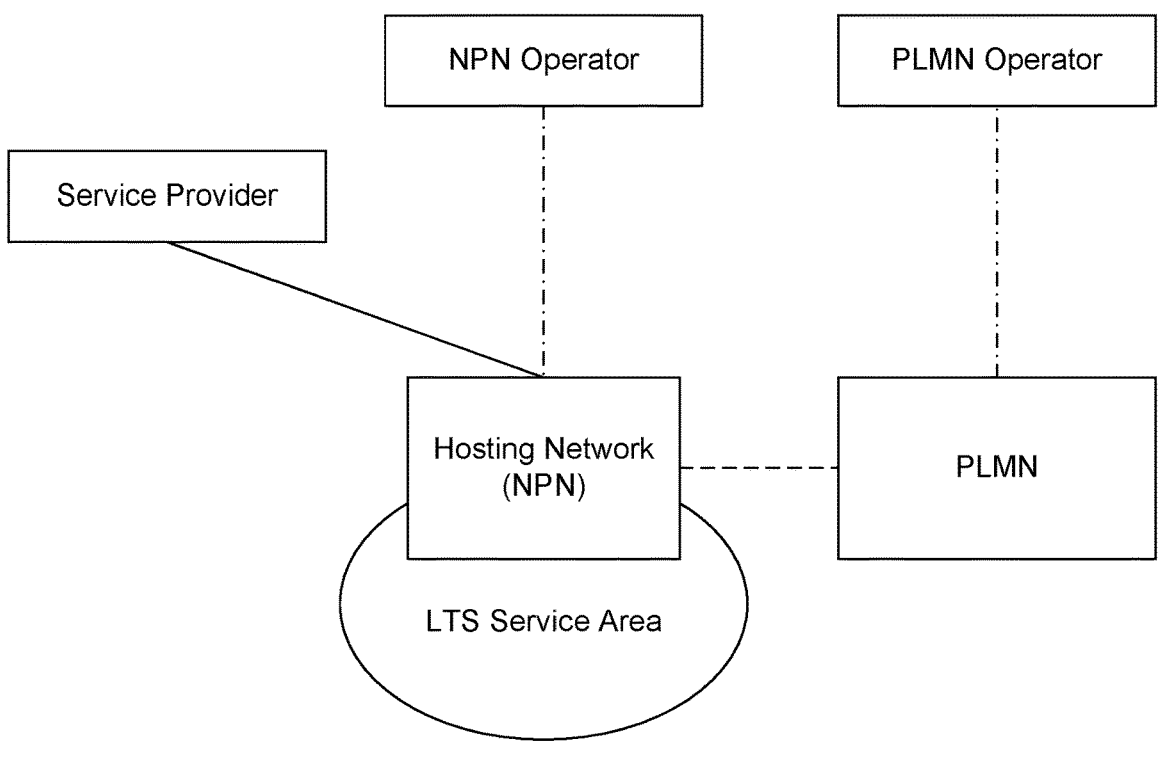
Figure 2C:
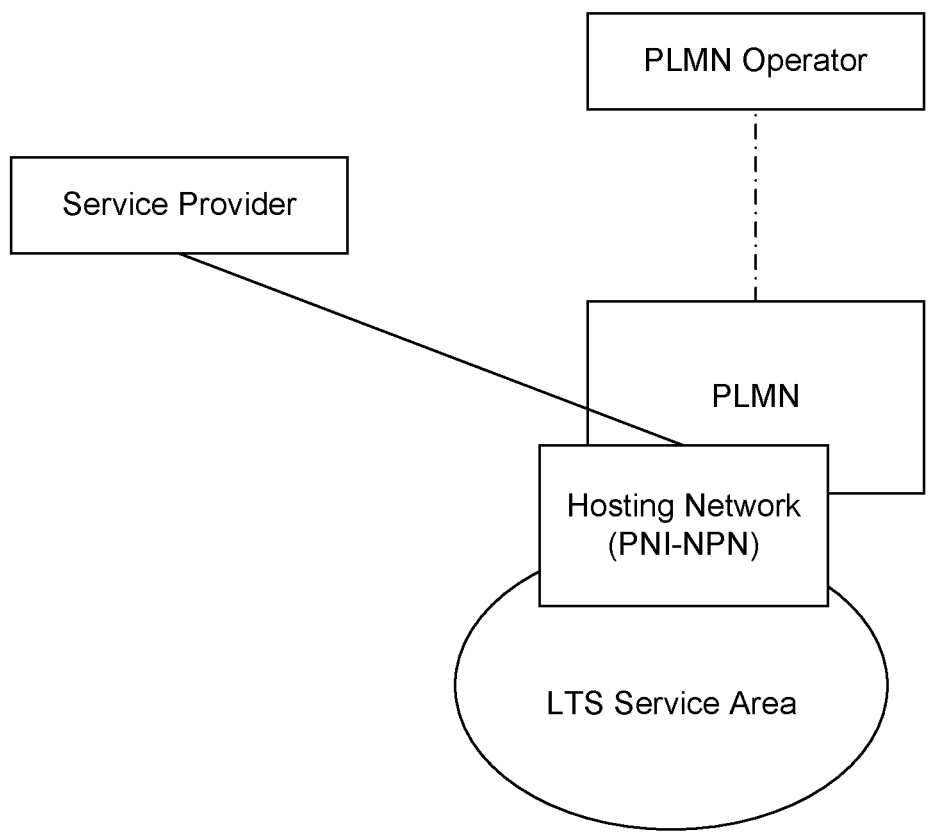

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b, 180c may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers (not shown) to the WTRU 102a. A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c in FIG. 1C). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration, WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized by WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

If the potential LTS user's serving network has a business relationship or service agreement with the LTS hosting network, it should be possible for the potential user to receive LTS service advertisement via the user's serving PLMN. For example, the methods used for Multimedia Broadcast/Multicast Service (MBMS) service announcement as defined in TS 23.246 can be reused or enhanced to deliver LTS advertisements to potential users. The users may also receive LTS service information from the serving PLMN via system information broadcast or Non-Access Stratum (NAS) signaling. In addition, new technologies such as 5G Multicast-Broadcast Service (5MBS) may also be utilized for LTS service advertisement.

After the potential user obtains the LTS information, the user may not be able to immediately access the service. LTS hosting networks are usually Non-Public Networks or temporary networks for which the potential users do not have a subscription or network selection configuration. To enable the users to access the hosting network and the service, the UE needs i) basic credentials to access the hosting network and ii) to be able to automatically select the hosting network, both of which will be described in the next paragraphs.

The hosting network can be a temporary network without subscribed users, and would encourage more users to access the service but for the fact that it does not have basic security checks, which could lend itself to potential abuse. The hosting network could benefit from a mechanism that allows access only to legitimate users and the ability to identify and charge the users for the service. From the perspective of the potential service user, the UE needs to be able to obtain the basic credentials for accessing the temporary hosting network.

The potential users may obtain the network identifiers of the hosting network via service advertisement. Theoretically, they may manually select the hosting network to access the service. However, the process of manual network selection may discourage users from using the service. On the other hand, if the UE has good coverage of its serving PLMN, automatic selection of a network to which the UE does not have a subscription or configuration cannot be triggered according to the existing specifications.

Additionally, the UE may utilize the onboarding and remote provisioning mechanism introduced in 3GPP Rel 17 to obtain a temporary subscription and credentials of the hosting network. If a PLMN is used as the onboarding network, the Data Network Name Single Network Slice Selection Assistance Information (DNN/S-NSSAI) used for remote provisioning is part of the UE's subscription data. Also, the Provisioning Server (PVS) address, e.g., PVS Fully Qualified Domain Name (FQDN) or PVS Internet Protocol (IP) address, is configured per DNN/S-NSSAI in the network (e.g., in the SMF) and may be sent to the UE, e.g., during the PDU Session establishment procedure. However, if the remote provisioning is for the LTS network/service, the UE's subscription data will not have the DNN/S-NSSAI configuration for the target LTS network, as the target service/network is dynamically chosen. Therefore, the onboarding network, i.e., the PLMN, would not have the per-DNN/S-NSSAI configuration of the provisioning server address.

A similar issue exists for the case in which the UE uses a Standalone Non-Public Network (SNPN) as the onboarding network, in which SNPN does not know which PVS address should be provided to the UE for remote provisioning. Additionally, it may not be known how the UE selects a SNPN for onboarding and remote provisioning for the target LTS network.

Thus, methods, techniques, apparatus, and means are needed to enable a UE to obtain the remote provisioning configuration (e.g., PVS address) if it uses a PLMN or SNPN as the onboarding network and/or to select a SNPN for onboarding and remote provisioning for the target LTS network.

For all of the reasons discussed herein above, in the following discussion, various methods, apparatus, techniques, and means for temporary provisioning of LTS hosting network credentials are presented.

LTS Hosting Network Credential Provisioning Via Network Exposure Function

Figure 3:
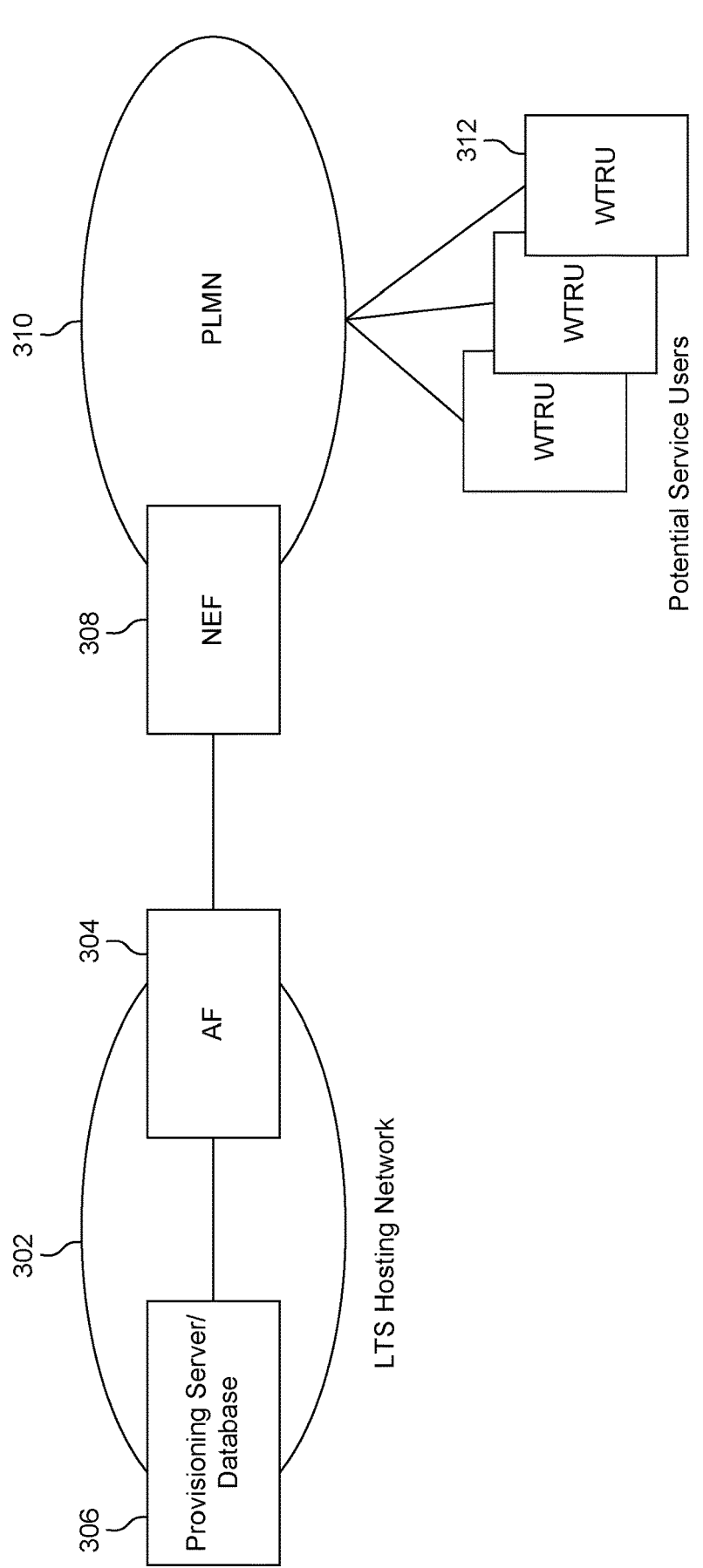
FIG. 3 illustrates a high-level network architecture of a LTS hosting network credential provisioning via Network Exposure Function according to an embodiment.

FIG. 3 illustrates a high-level network architecture of a LTS hosting network credential provisioning via Network Exposure Function (NEF) 308 (e.g., network exposure framework) according to an embodiment. An Application Function (AF) 304 in the LTS hosting network 302 monitors the LTS subscription request events in the PLMN 310 via the NEF 308 of the PLMN. When such an event from a particular service user (e.g., UE or WTRU)) 312 is detected, the AF 304 in the hosting network 302, together with the provisioning server/database 306 in the hosting network 302, creates temporary credentials and other configuration information for the UE, and delivers these credentials and/or configuration information to the respective UE 312 via the PLMN network exposure framework.

To achieve this, the network elements perform certain tasks:

1) The AF 304 in the hosting network 302 subscribes to the 'LTS subscription request' event in the PLMN 310 via the NEF 308.
2) The potential LTS service users 312 in the PLMN 310, which have received the LTS service advertisement and consented to use the service, submit LTS subscription requests through the network signaling.
3) Network functions (e.g., AMF or SMF) in the PLMN 310 detect the 'LTS subscription request' events and report the events to the NEF 308, which in turn reports the events back to the AF 304 in the hosting network 302.
4) The AF 304 in the hosting network 302, together with the provisioning server 306 in the hosting network 302, creates the temporary credentials and other configuration information for the UEs 312 that requested LTS subscription, and delivers these to the UEs 312 via the NEF 308 in the PLMN 310.

These steps will now be described in detail.

LTS Subscription Request Event Monitoring

The AF in the hosting network may subscribe to the 'LTS subscription request' events in the PLMN using the Nnef_EventExposure_Subscribe provided by the PLMN NEF. A new event ID may be created for 'LTS subscription request' event. In addition to typical parameters for subscribing to event reporting, such as Event Filter Information, Target of Event Reporting, etc., the AF may provide one or more of the following information items in the event subscription request:

LTS service name: identifies the LTS services offered by the hosting network. If the service name indicated in the user's LTS subscription request matches the service name in the event subscription request, the event is triggered and the event can be associated with the target event report receiver (i.e., the hosting network).

Network identifier of the hosting network: For example, if the hosting network is a Standalone NPN (S-NPN), the PLMN ID and Network ID of the S-NPN may be provided. If the PLMN has relationship with multiple LTS hosting networks, the PLMN may determine which LTS hosting network should receive the event report based on the network identifier indicated in the user's LTS subscription request.

IP address/port number corresponding to an Internet URL: The user may initiate the LTS subscription request via the User Plane in the PLMN towards an Internet URL that has been provided in the service advertisement, e.g., by sending a HTTP request to the URL. The UPF function in the PLMN may be configured by the SMF to check the destination IP address/port number of the Internet traffic packets, and if it matches the configured IP address/port number, the UPF may report it to the SMF.

LTS service area: Because LTS typically are available in a limited area, the event monitoring may also be limited in a corresponding area in the PLMN. The PLMN may map the LTS service area to a corresponding area in the PLMN, e.g., a list of Tracking Areas, and only configure the network functions (e.g. AMFs) serving that area for event monitoring.

Maximum number of allowed subscriptions: As a temporary network that may be of a smaller size (e.g., coverage area), the LTS hosting network may have a limited capacity to accommodate users, e.g., no more than a certain number of them. Therefore, it may set a limit of number of users for each PLMN with which it has a business relationship. When the subscription request or provisioning has reached the maximum number, the PLMN may stop reporting new subscription request events to the hosting network. The AF may also dynamically update this number using the NEF service.

Upon reception by NEF of the event subscription request, if the request can be authorized, the NEF subscribes the event to the Unified Data Management (UDM) by sending a Nudm_EventExposure_Subscribe request. The NEF may map the LTS service area to a certain PLMN area (e.g., a list of TAs) and include it in the request. The UDM determines the network functions (e.g., AMFs or SMFs) that serve the area and invoke the event exposure service of those network functions. If User Plane event detection is to be used, i.e., event detection by matching the IP address/port number of Internet traffic (e.g., HTTP request to a URL), the SMF may further determine the related PDU Sessions and configure the serving UPFs to monitor the UP packets.

LTS Subscription Request Event Triggering and Reporting

When a potential LTS user has received the LTS service advertisement and consented to use the service, it may trigger the UE to submit a LTS subscription request in the PLMN using either Control Plane (CP)-based method or User Plane (UP)-based method.

Figure 4:
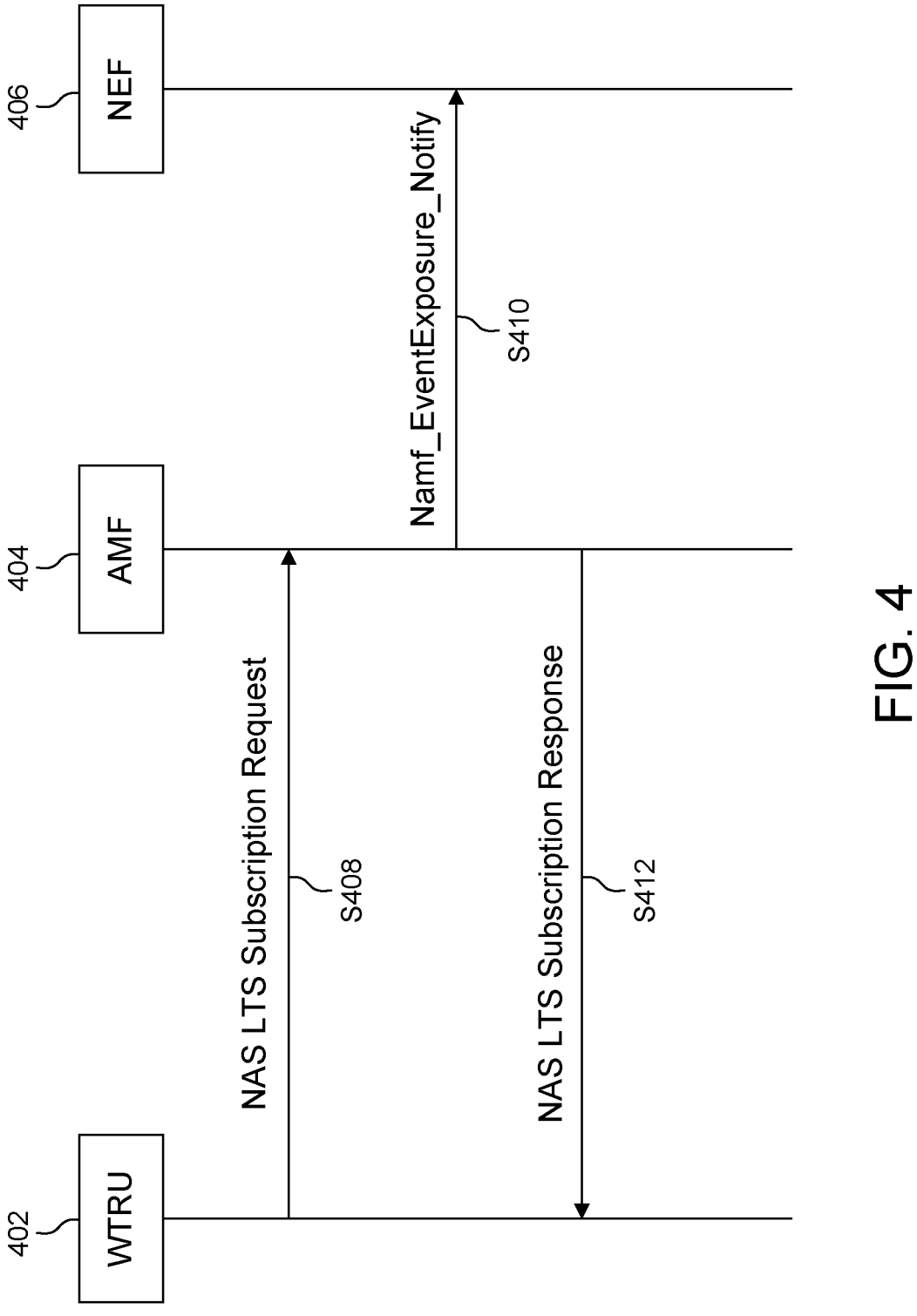
FIG. 4 illustrates the Control Plane-based method for LTS subscription request event triggering and reporting according to an embodiment.
Figure 5A:
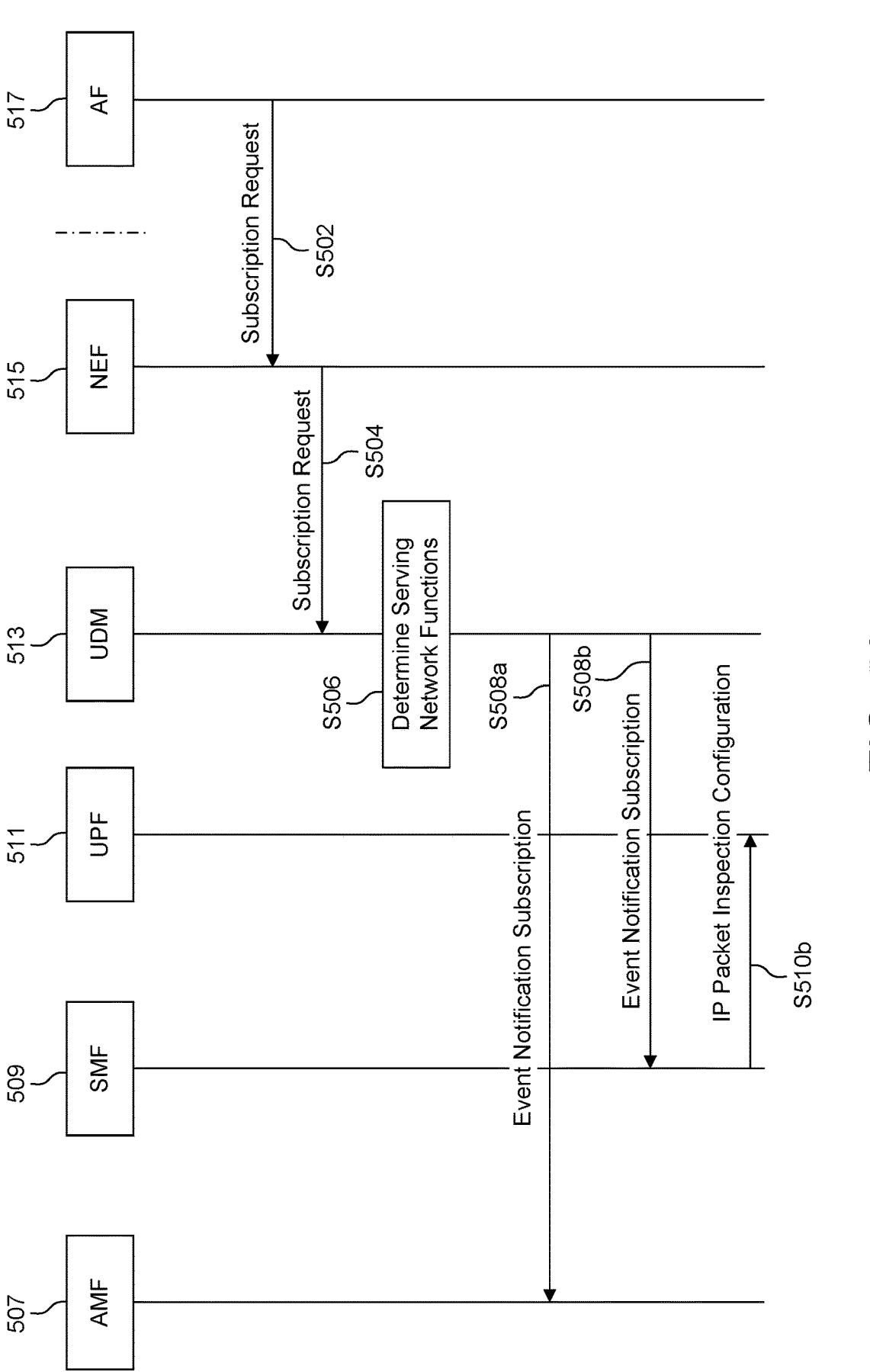
FIGS. 5A-5D illustrate in more detail a method for provisioning LTS hosting network credentials to the UE via the network exposure framework according to an embodiment.
Figure 5B:
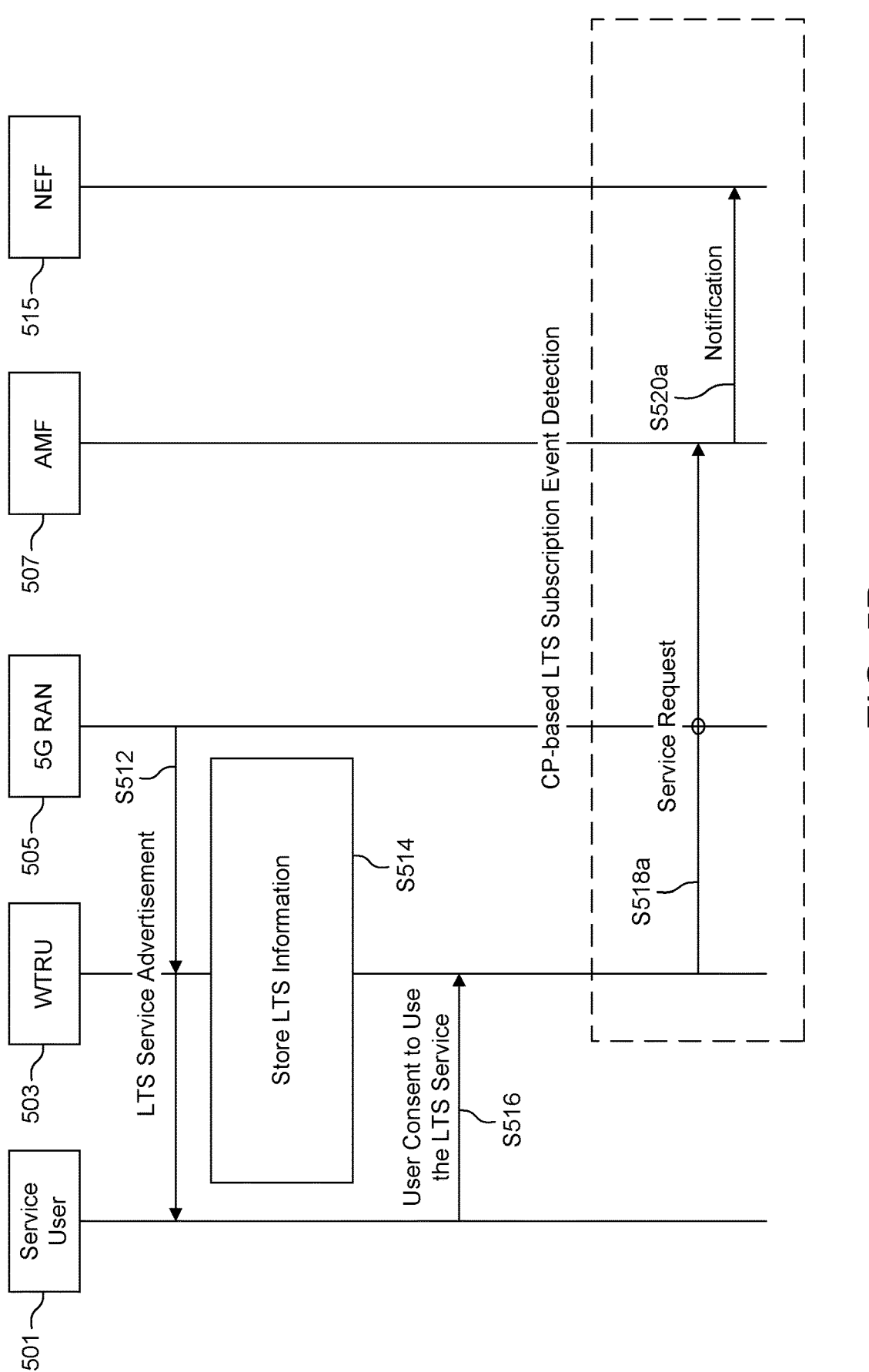
Figure 5C:
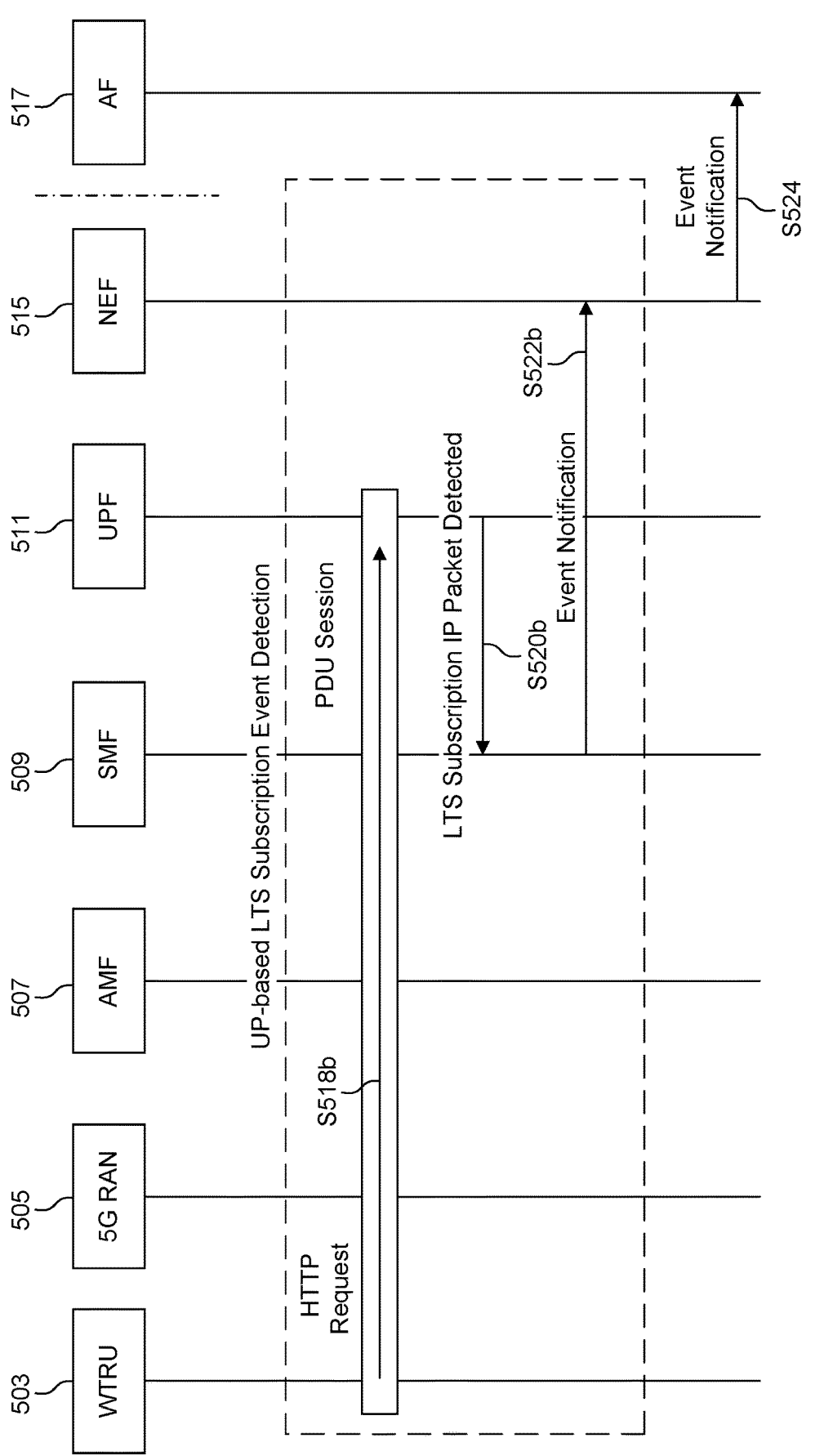
Figure 5D:
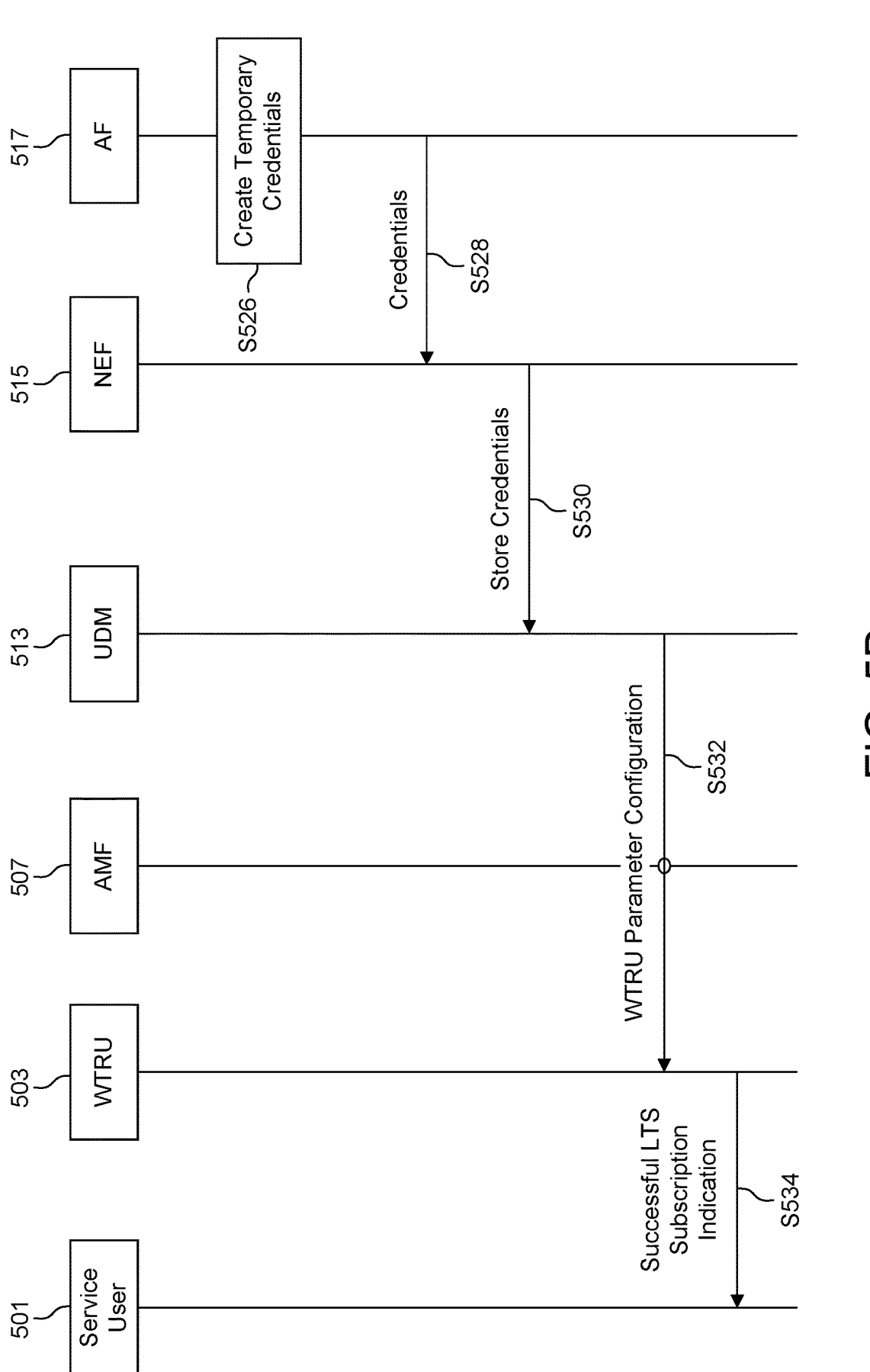

FIG. 4 illustrates an example of the CP-based method. The UE 402 uses network signaling, e.g., NAS signaling, to submit the LTS subscription request. The UE 402 may submit the LTS subscription request in a new NAS procedure, e.g., by sending, in step S408, a NAS LTS Subscription Request message. The LTS Subscription Request message may include:

LTS service name or code that identifies the LTS that the user desires to access. The LTS service name may have been received from the LTS service advertisement/notification and stored in the UE.

Network identifier of the hosting network. For example, if the hosting network is a Standalone NPN, the PLMN ID and Network ID of the S-NPN may be included. The hosting network identifier may have been received from the LTS service advertisement/notification and stored in the UE.

LTS Network Slice or S-NSSAIs associated to a LTS. For example, the hosting network may have a business agreement with the Mobile Network Operator (MNO) to allocated dedicated Network Slices for the LTS.

If the serving network function (e.g., AMF) in the PLMN has been configured to monitor LTS subscription request event, and the LTS service name and/or hosting network identifier in the LTS Subscription Request matches the event monitoring configuration, the LTS subscription event is detected and reported back, in step S410, to the NEF, e.g., in a Namf_EventExposure_Notify message. The network may provide, in step S412, a response (e.g., a NAS LTS Subscription Response message) to the UE that the LTS subscription request has been successfully submitted, if the event report has been reported to the NEF and in turn to the hosting network; or that the request has failed if for some reason the event report is not sent.

Alternatively, the LTS subscription request can be submitted as part of other NAS procedures, such as Registration Update, Service Request, etc. For example, an indication of LTS subscription request and a container that carries the LTS subscription request information described above may be included in the Registration Update Request or Service Request message.

In the UP-based method, the UE may have acquired an Internet URL from the service advertisement/notification, and may send a request (e.g., HTTP request) towards the URL over a certain PDU Session in the PLMN. The serving SMF, which has been configured to monitor LTS subscription events, may have configured the serving UPFs to check the packets, e.g., check the IP headers of the packets. If the information in the IP headers (e.g., IP address/port number) matches the monitoring configuration, the UPF may report it to the SMF. The UPF may also perform deep packet inspection to retrieve other subscription related information (e.g., service name) in the HTTP request and report it to the SMF. The SMF then reports the LTS subscription event back to the NEF.

When the LTS subscription event is detected, either via CP-based method or UP-based method, the NEF may augment the event report with the Generic Public Subscription Identifier (GPSI, e.g., MSIDN or external identifier) of the UE and the identifier of the home PLMN and/or the serving PLMN, and send the event report to the AF in the hosting network.

Temporary Credential Creation and Delivery

When the hosting network receives a LTS subscription request from a service user (e.g., a WTRU or other UE), the provisioning server 306 in the hosting network 302 may assign a temporary UE identifier and a credential or token associated with the temporary UE identifier. In addition, the temporary UE identifier and token may be associated to a specific Network Slice. Slice Specific Authentication could be used to enable access to the LTS in the hosting network for this specific UE. It may also set a lifetime period for the temporary UE identifier and the credential/token. The lifetime period of the temporary UE identifier/credential may also indicate the period during which the LTS service is available. The hosting network may also maintain a binding between the UE's GPSI and the temporary UE identifier for the purpose of billing.

The AF may invoke the NEF service of the PLMN, e.g., Nnef_ParameterProvisioning_Create to deliver the UE temporary identifier and credential, together with the hosting network identifier that's associated with the credential, to the UE through the PLMN. The hosting network may also provide other necessary configuration information, such as dedicated Data Network Name (DNN), network slicing info, Closed Access Group Identifier (in cast the hosting network is a PNI-NPN), etc. for the LTS in the hosting network to the UE. The PLMN may provide additional information, such as PLMN area corresponding to the LTS service area, to the UE.

Referring to FIGS. 5A-5D (showing a subset of the entities in each diagram), a method for provisioning LTS hosting network credentials to the UE via the network exposure framework according to an embodiment is shown.

In step S502, the AF 517 in the hosting network subscribes to the 'LTS subscription request' event notification in the PLMN by sending a request (e.g., a Nnef_EventExposure_Subscribe request with information about the subscription event and the service name) to the NEF 515. The AF 517 may provide the event related information such as the LTS service name, hosting network identifier, LTS service area, etc. in the request.

In step S504, the NEF 515 subscribes to the event notification by sending a request (e.g., a Nudm_EventExposure_Subscribe request) to the UDM 513. The NEF 515 may map the LTS service area to a certain PLMN area such as a list of TAs and provide it to the UDM 513.

In step S506, the UDM 513 determines the serving network functions based on how the event is triggered and the related PLMN area. If the corresponding network function is the AMF 507, the UDM 513 subscribes, in step S508a, to the event notification e.g., by sending a Namf_EventExposure_Subscribe request (including LTS subscription event, service name and IP address/port) to the serving AMFs 507. However, if the corresponding network function is the SMF 509, the UDM 513 subscribes, in step S508b, to the event notification by sending a Nsmf_EventExposure_Subscribe request (including e.g., LTS subscription event, service name, IP address/port, etc.) to the serving SMFs 509; and in case the event detection is based on UP packet inspection, the SMF may configure, in step S510b, the UPF 511 for the IP header information to be matched for event detection, i.e. for IP packet inspection.

In step S512 (see FIG. 5B), the UE 503 receives a LTS service advertisement (e.g., through an SMS, the Web, etc.) and can inform the service user 501.

In step S514, the LTS service information, such as LTS service name, hosting network identifier, etc. may be stored in the UE 503.

In step S516, the UE 503 receives user consent to use the service. The user consent may trigger the UE 503 to initiate LTS subscription request in the PLMN using either CP-based method (in steps S518a and S520a) or UP-based method (in steps S518b, S520b and S522b).

CP-based method. In step S518a, the UE 503 may send a NAS Service Request message to the serving AMF 507. The Service Request message may include a LTS subscription request indication and a LTS information container. In step S520a, in case the LTS information (service name, network identifier) in the Service Request message matches the event monitoring configuration the AMF 507 received in step S508a, the AMF 507 considers the LTS subscription event to have been detected and notifies the NEF 515 of the event by sending a Namf_EventExposure_Notify to the NEF 515.

UP-based method. In step S518b (see FIG. 5C), the UE 503 may send a HTTP Request towards a URL which was provided in the service advertisement. The HTTP request may be sent over the PDU Session in the PLMN. In step 520b, in case the IP header information of a packet matches what is configured in step S510b, the UPF 511 reports this to the SMF 509. The UPF 511 may further retrieve other information in the HTTP request by deep packet inspection and send this to the SMF 509. In step 522b, the SMF 509 notifies the NEF 515 of the event by sending a Nsmf_EventExposure_Notify (including e.g. an identifier of the LTS subscription event) to the NEF 515.

In step S524, the NEF 515 forwards the event notification from AMF 507 or SMF 509 to the AF 517 in the hosting network. The NEF 515 may augment the event notification (e.g., the identifier of the LTS subscription event) with additional information such as GPSI of the UE, Home PLMN and Serving PLMN identifier, etc.

In step S526 (see FIG. 5D), the AF 517, together with the provisioning server (not shown here) in the hosting network, allocates temporary UE identifier and creates credentials for the UE 503.

In step S528, the AF 517 invokes the NEF service to deliver the credentials and the associated network identifier to the UE 503 by sending a Nnef_ParameterProvision_Create (e.g., including the GPSI and LTS credentials) request to the NEF 515.

In step S530, the AF 517 may request the UDM 513 to store the LTS credential and other related parameters as part of UE subscriber data by sending a Nudm_ParameterProvision_Create request to the UDM 513.

In step S532, the UDM 513 may initiate a UE parameter update (i.e., configuration) procedure to deliver the LTS credential and other related parameters to the UE 503. The UE 503 stores the data and may start a timer to monitor the validity of the data according to the lifetime period associated to the data.

In step S534, upon reception of the LTS credential and configuration information, the UE 503 may indicate to (i.e., notify) the service user 501 that the LTS service subscription is successful.

When the UE determines that the received LTS credential has expired, based on the lifetime associated with the credential, the UE may locally discard the credential. The UDM in the PLMN may also discard the LTS credential and other related parameters when it has expired, or upon the request of the AF of the LTS hosting network.

LADN Based Access to Local Services

The UE may be notified of a new service or temporary service when it enters the area (e.g., tracking area or registration area) where the service is being provided, for example by having the network send to the UE new Local Area Data Network (LADN) information when it enters the area. The network may use the UE Configuration Update (UCU) procedure to send the LADN information. The LADN information may include the information about the LADN DNNs from the LTS hosting network. The network may further provide the UE with new UE Route Selection Policy (URSP) rules to connect to the LADN from the hosting network. In case the UE, based on the received information, decides to use the local or temporary service from the LTS hosting network it may trigger the procedure described with reference to FIGS. 5A-5D (see e.g., step S516 to step S534) to receive temporary credentials for LTS hosting network (either using the CP-based approach or UP-based approach). The UE may then connect to the LTS hosting network and establish a LADN PDU session receive access to the local temporary services.

Figure 6:
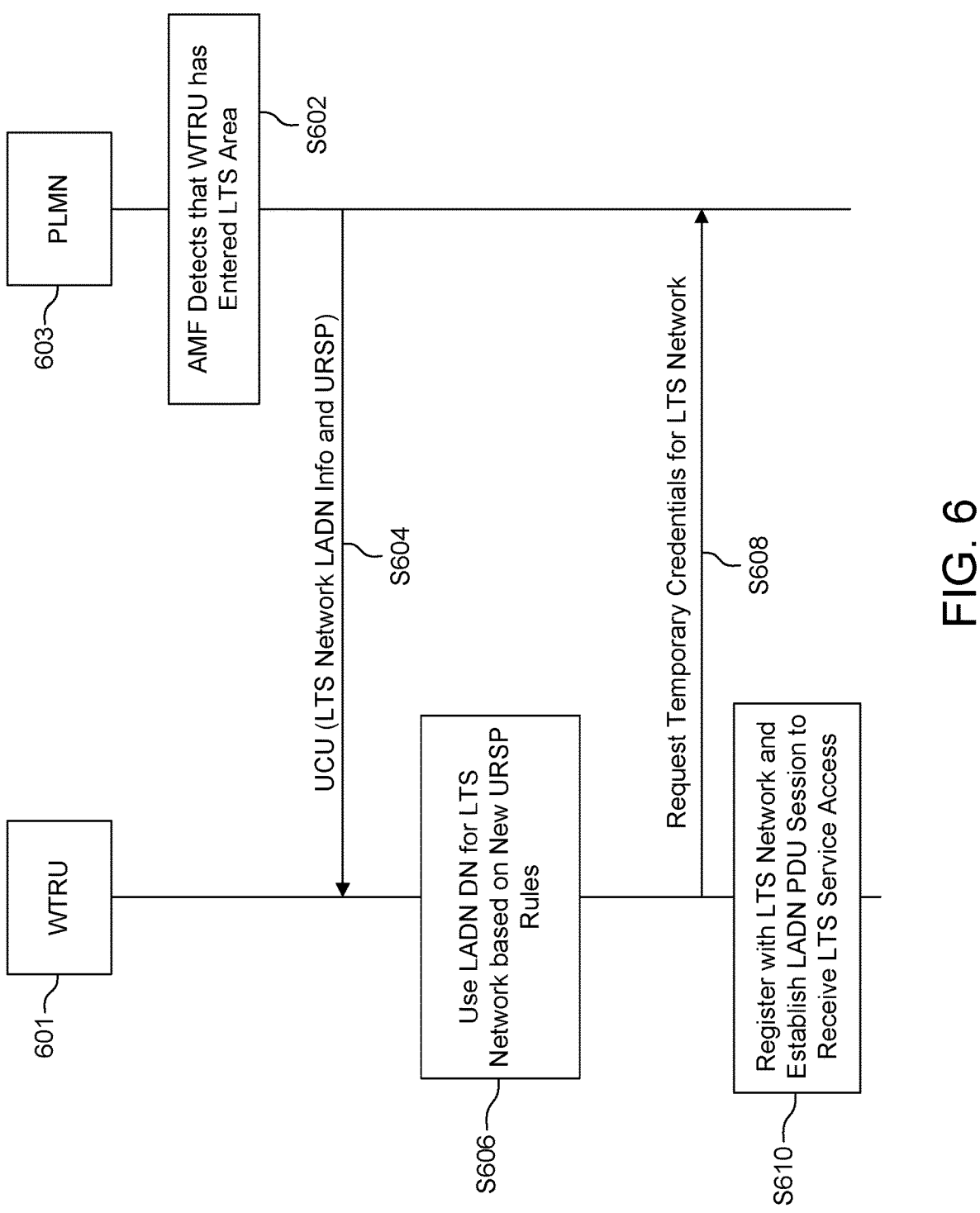
FIG. 6 illustrates a method for LADN based access to the local temporary service according to an embodiment.

FIG. 6 illustrates LADN based access to the local temporary service according to an embodiment.

In step S602, the AMF in the PLMN 603 detects that the UE 601 has moved into the area with local temporary services. The detection may be based on the current UE tracking area or registration area.

In step S604, the AMF in the PLMN 603 initiates UCU procedure. The AMF may include the LADN info of LTS network, URSP for LTS network in the UCU message to the UE 601. The AMF may also include an indication for the UE 601 to perform the registration procedure.

In step S606, the UE 601 may need access to the LTS service. Based on the new received URSP rules, the UE 601 decides to use the LADN DN for LTS network.

In step S608, the UE 601 requests temporary credentials for LTS network as described in FIGS. 5A-5D, (e.g., steps S516 to S534).

Upon receiving the temporary credentials, the UE 601 registers, in step S610, with the LTS network and establishes the LADN PDU session to receive access to LTS services.

Figure 7:
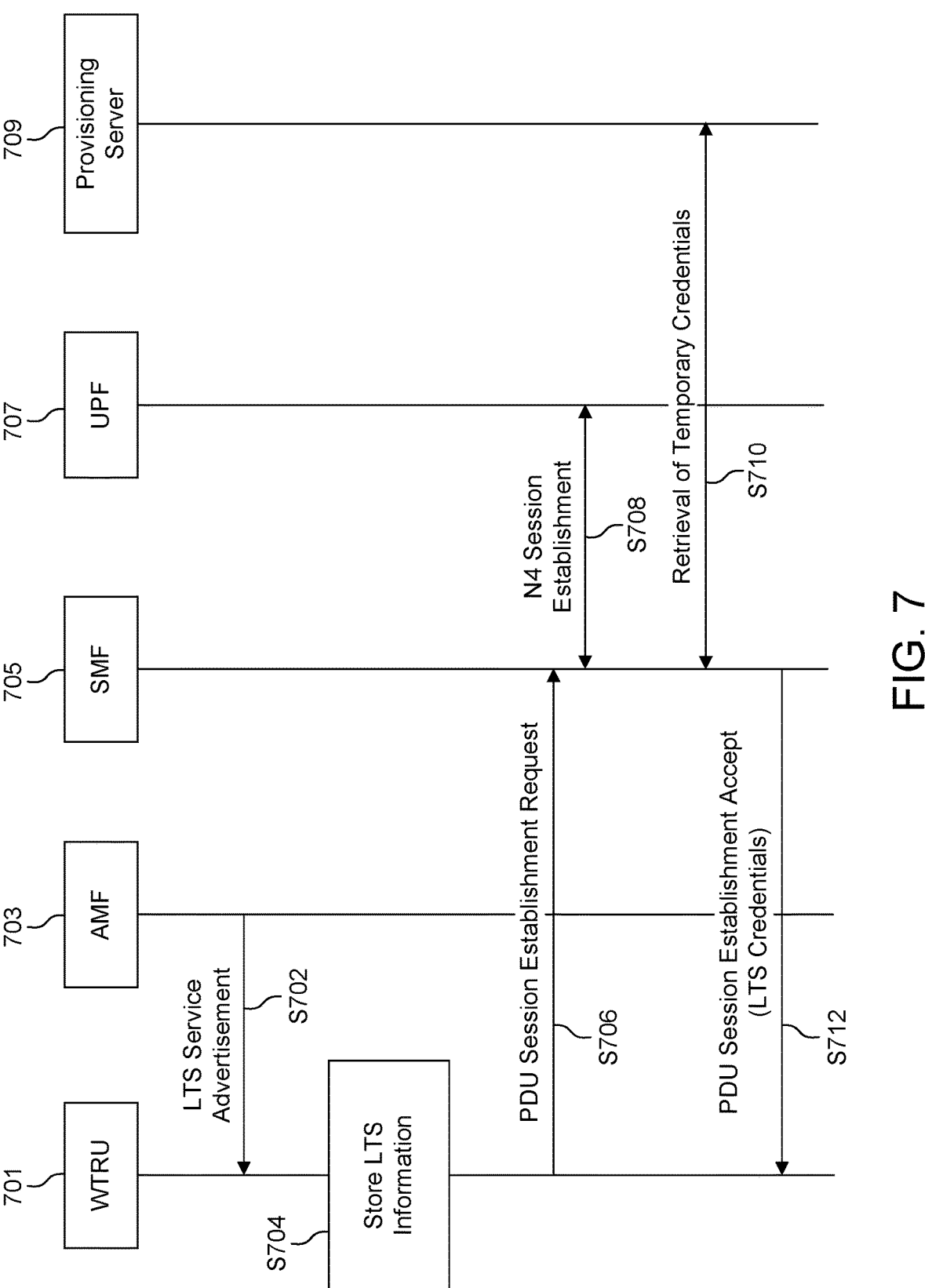
FIG. 7 illustrates a method for LTS hosting network credential provisioning via PDU Session establishment procedure according to an embodiment.

LTS Hosting Network Credential Provisioning Via PDU Session Establishment Procedure Referring to FIG. 7, in an embodiment the UE initiates a PDU Session establishment procedure for the purpose of requesting temporary credentials for the LTS service. The Data Network Name used for the PDU Session establishment may be a common DNN for all LTS services; instead of indicating the DNN, the UE may rely on the network to choose a DNN that corresponds to the LTS service that the UE desires to access. In step S702, the UE receives a LTS service advertisement (e.g., through an SMS, the Web, etc.) and can inform the service user, and in step S704, the LTS service information, such as LTS service name, hosting network identifier, etc. may be stored in the UE. The UE may include, in step S706, a 'LTS subscription request' and a LTS information container in the PDU Session establishment request message. Upon receiving the message, the SMF identifies the target server (e.g., Provisioning Server) in the hosting network according to the provided LTS information (e.g., LTS service name, hosting network identifier, etc.). The mapping between the LTS information and the target Provision Server address may have been configured in the SMF. The SMF then establishes, in step S708, a N4 session with the UPF and, through the UPF, establishes a data connection with the provisioning server in the hosting network. The SMF may then communicate with the provisioning server, e.g., by invoking the API provided by the Provisioning Server to retrieve, in step S710, the temporary credential for accessing the hosting network. The SMF may provide the UE identity (e.g., GPSI) and other information to the provisioning server.

After the SMF has received the temporary credentials, it may forward these, in step S712, to the UE in the PDU Session establishment accept or reject message. Because the PDU Session establishment request is for the purpose of retrieving LTS credentials, the SMF may not allocate real UP resources for the UE.

Figure 8:
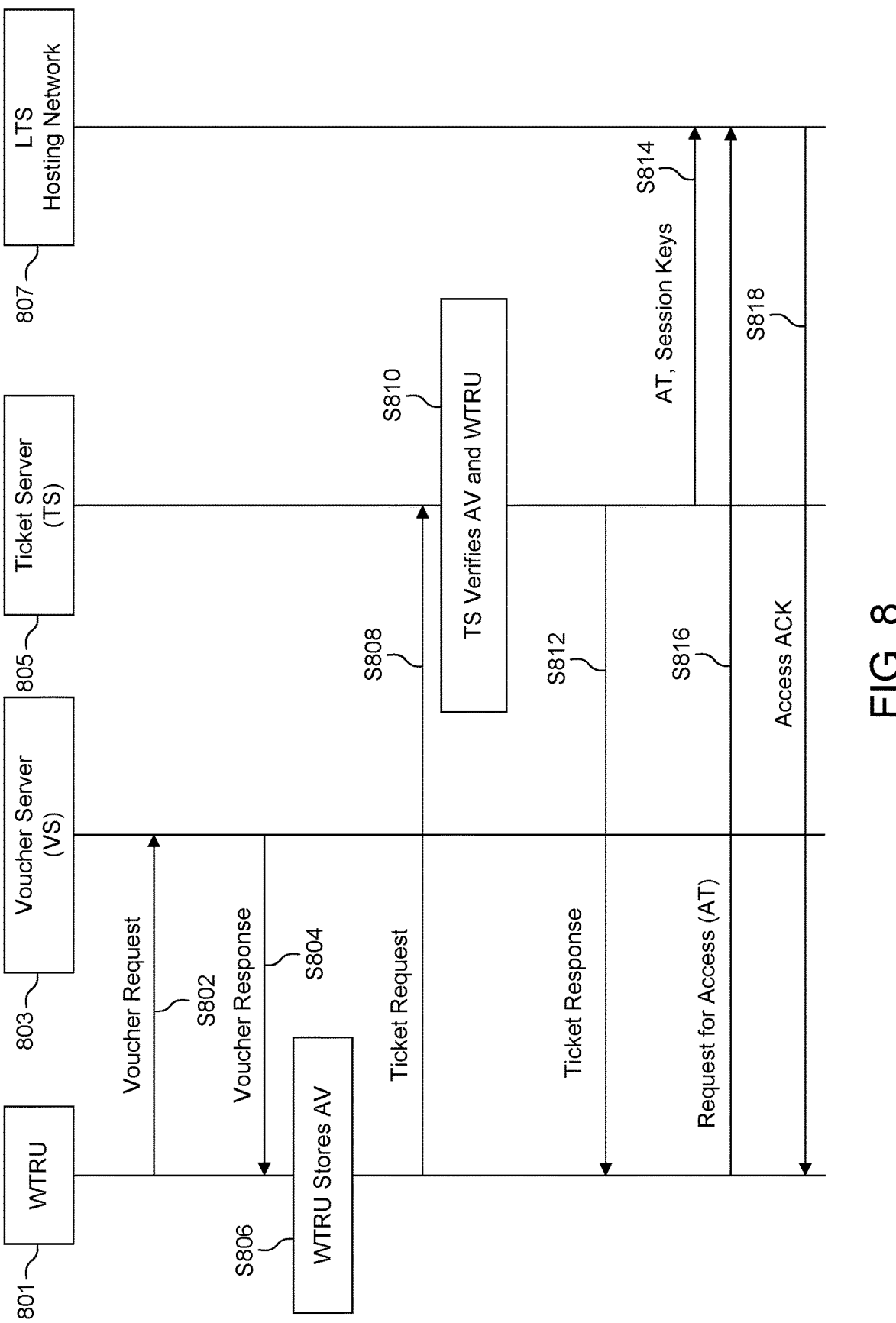
FIG. 8 illustrates a method for LTS hosting network credential provisioning via Voucher Server and Ticket Server according to an embodiment.

LTS Hosting Network Credential Provisioning Via Voucher Server and Ticket Server FIG. 8 illustrates a method for LTS hosting network credential provisioning via Voucher Server and Ticket Server according to an embodiment.

It is assumed that the UE 801 and the Ticket Server 805 have a pre-established security context.

In step S802, the UE 801 requests an Access Voucher (AV) from the Voucher Server (VS) 803.

In step S804, the VS 803 verifies the credentials of the UE 801 and sends back encrypted Service Voucher (SV) that may include an AV, a Ticket Server (TS) identifier and an identifier of LTS Hosting Network 807.

In step S806, the UE 801 stores the AV; when the AV expires, the local UE session manager requests another SV (which may be transparent to the user).

When the UE 801 requests access to a LTS, or other resource on the network:

In step S808, the UE 801 sends the current AV to the TS 805 (i.e., the TS corresponding to the TS identifier) with the LTS Hosting Network ID (or the normal expression with a wildcard) the UE 801 wants to access.

In step S810, the TS 805 verifies the AV received from the UE 801 and that the UE 801 is authorized to access the desired network; alternatively, or in addition, the TS 805 queries the list of the networks that the UE 801 is authorized to access.

In step S812, the TS 805 replies to the UE 801 with the list of networks/resources with associated Access Tickets (AT) and valid session keys for network(s)/resource(s) (e.g., LTS Hosting Network identifier, AT for LTS Hosting Network and session keys).

In step S814, the TS 805 forwards the AT to the LTS Hosting Network 807 together with the session keys.

In step S816, the UE 801 forwards the AT to the desired network, in this case LTS Hosting Network 807, to prove that the UE 801 has access, and the network/resource 807 grants access.

In step S818, the network/resource 807 returns an Access Ack to the UE 801 that then can access LTS Hosting Network 807.

In a variant, the TS 805 replies with available LTS Hosting Networks or other resources list to the UE 801.

Both the AV and the AT are temporary and may be one-time use, set-time use, etc. This can make it possible such that no explicit revocation is needed.

The Voucher Server 803 may be an extension of the existing Authentication Function in 5GS.

Automatic Access to the Hosting Network

As already described, the UE may, for the LTS hosting network, acquire a network identifier or CAG identifier for the hosting network, temporary UE identifier for the hosting network, temporary credentials for the hosting network, the area in which the LTS service is available and the time period during which the LTS service is available.

To discover the LTS hosting network or the CAG cell, the UE may start a periodic network scanning process, during the time period and in the area that the LTS service is available. The scanning process may be triggered by a timer or upon the user consent to use the service. If the hosting network or the CAG cell that matches the network identifier or the CAG identifier can be found, the UE may present the discovered network or CAG cell to the user. If the user instructs it to switch to the hosting network or the CAG cell, the UE may start registration with the hosting network using stored temporary credentials or reselects the CAG cell. The UE may deregister from its current serving PLMN or inform the serving PLMN that it will temporarily leave for the LTS service.

In an embodiment, the service provider and the hosting network may track the user's location through the PLMN. When the hosting network has detected that the user (i.e., the UE 901) is within its LTS service area, it may send a notification to the user through the PLMN signaling. The notification may trigger the UE to search for the hosting network, and if found, switch to the hosting network. For example, the hosting network may subscribe to the event notification of the UE's location reporting or UE presence in an 'Area of Interest' through the NEF in the PLMN. When it has detected that the UE is within its service area, the hosting network may invoke the NEF's application triggering service to deliver a notification to the UE (e.g., a SMS notification). Upon receiving the notification, the UE may start searching for the hosting network and switch to the hosting network.

Figure 9:
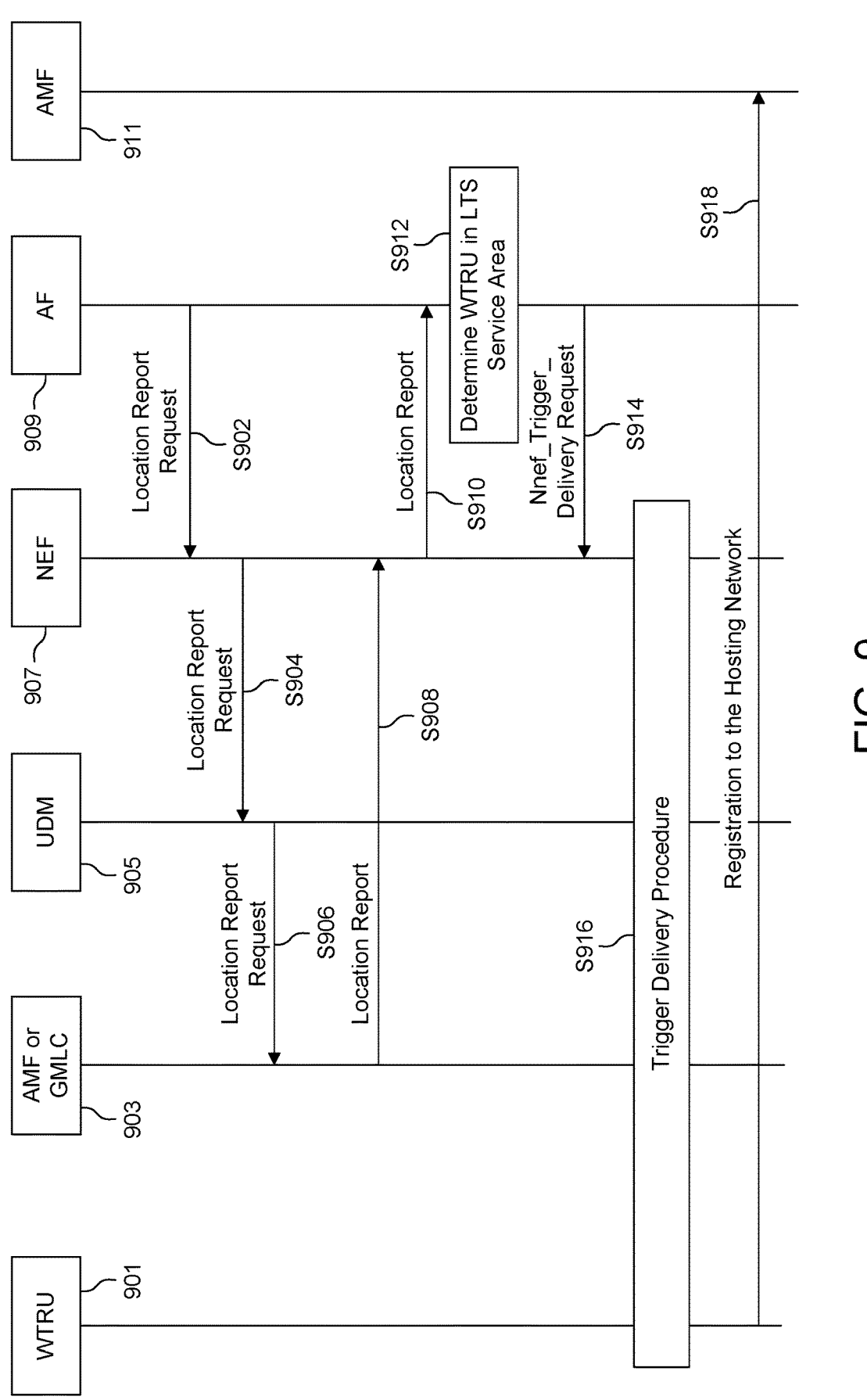
FIG. 9 that illustrates automatic network access triggering using PLMN location and application trigger service according to an embodiment.

FIG. 9 illustrates automatic network access triggering using PLMN location and application trigger service according to this embodiment in greater detail. In step S902, an AF 909 can send, to a NEF 907, a request for a report regarding the location of a UE 901 (e.g., a Nnef_EventExposure_Subscribe request including an indication that the request is for a location report and the GPSI of the UE 901). In step S904, the NEF 907 forwards the request to a UDM 905 (e.g., a Nudm_EventExposure_Subscribe request including an indication that the request is for a location report and an identifier of the UE 901). In step S906, the UDM 905 forwards the request to an AMF 903, or a GMLC, (e.g., a Namf_Location_Service message including an indication that the request is for a location report and an identifier of the UE 901). In step S908, the AMF 903 (or GMLC) returns a location report with location data for the UE 901 to the NEF 907 (e.g., a Namf_EventExposure_Notify message with the location data). In step S910, the NEF 907 forwards the location report with location data for the UE 901 to the AF 909 (e.g., a Nne_EventExposure_Notify message with the location data). Based on the location data for the UE 901, in step S912, the AF can determine whether the US is in the LTS service area. In step S914, the AF 909 sends, to the NEF 907, a delivery request (e.g., a Nnef_Trigger_Delivery request), followed, in step S916, by a trigger delivery procedure, for example as described in 3GPP TS 23.501, "System Architecture for the 5G System", V16.6.0, 2020-09, Clause 4.13.2.2. The UE 901 can then, in step S918, register to the hosting network.

Remote Provisioning

If the UE uses a PLMN or a SNPN as the onboarding network, the UE may indicate its LTS service capability when it registers to the PLMN, e.g., in a Registration request message, or during the Service Request procedure. The onboarding network (the PLMN or the SNPN) may return a configuration of DNN/S-NSSAI combination for LTS network remote provisioning, e.g., in Registration Accept or Service Accept message or UE Configuration Update message. The DNN/S-NSSAI may be a generic configuration used for all LTS-network-related remote provisioning.

When the UE initiates the PDU Session establishment in the onboarding network for remote provisioning for the target LTS network, it may use the previously received DNN/S-NSSAI combination for the PDU Session request. It may also include an explicit indication that the PDU Session is requested for remote provisioning for LTS networks. The UE may also include additional target LTS service or network information in the PDU Session establishment request, such as the target LTS service identifier or name, the target LTS hosting network identifier or name, etc. The UE may have acquired this additional service information through LTS service advertisement, e.g., from a Web portal or a short message. Using the target LTS service information provided by the UE, the onboarding network (the PLMN or the SNPN) may identify the corresponding remote provisioning configuration, e.g., PVS address, and return it to the UE, e.g., in the PDU Session Establishment Accept message or UE Configuration Update message. Then, the UE may use the established PDU Session and the received configuration (e.g., PVS address) to access the provisioning server of the target LTS network for retrieving LTS network credentials, and other information for selecting and accessing the target LTS network.

Alternatively, when the LTS-capable UE indicates its LTS service capability to the onboarding network, e.g., in a Registration request message, or during a Service Request procedure, the onboarding network (the PLMN or the SNPN) may return a list of the LTS service information that the onboarding network supports for provisioning (e.g., the onboarding network has the service agreement with those LTS service providers). The list may include the supported LTS service identifiers/names and corresponding LTS hosting network identifiers and names, the DNN/S-NSSAI combinations for remote provisioning for those LTS networks, the remote provisioning configuration (e.g., PVS addresses) for those LTS networks, etc. The onboarding network may provide the list of LTS service information during the Registration procedure (e.g., in a Registration Accept message), Service Request procedure (e.g., in Service Accept) message, or UE Configuration Update procedure.

Upon receiving the list of the supported LTS service information, the UE may select the target LTS service and use the corresponding configuration (e.g., the DNN/S-NS-SAI combination corresponding to the target LTS service) to establish the PDU Session for remote provisioning, and use the remote provisioning configuration (e.g., PVS address) to access the provisioning server and retrieve the LTS network credentials and other information for selecting and accessing the target LTS network.

Alternatively, when the LTS capable UE indicates its LTS service capability to the onboarding network, e.g., in a Registration request message, or during a Service Request procedure, the UE may additionally provide the target LTS service (such as the target LTS service identifier or name, the target LTS hosting network identifier or name, etc.) to the onboarding network. The onboarding network (the PLMN or the SNPN) may return the target LTS service information, which may include the DNN/S-NSSAI combinations for remote provisioning for the target LTS service, the remote provisioning configuration (e.g., PVS addresses) for the target LTS service, etc. The onboarding network may provide this information during the Registration procedure (e.g., in a Registration Accept message), Service Request procedure (e.g., in Service Accept) message, or UE Configuration Update procedure.

Upon receiving the list of the target LTS service information, the UE may use the corresponding configuration (e.g., the DNN/S-NSSAI combination corresponding to the target LTS service) to establish the PDU Session for remote provisioning, and may use the remote provisioning configuration (e.g., PVS address) to access the provisioning server and retrieve the LTS network credentials and other information for selecting and accessing the target LTS network.

In another embodiment, if the onboarding network is a SNPN, the SNPN may broadcast its supported (for provisioning) LTS service information, and the UE may use the broadcasted information for selecting the onboarding network. For example, if the UE's target LTS service/network is in a SNPN's broadcasted list of LTS service information, the UE may select the SNPN as the onboarding network. The UE then may indicate its target LTS service/network to the onboarding network, e.g., in a Registration Request, Service Request, or PDU Session Establishment Request, and the network may return the corresponding configuration (e.g., DNN/S-NSSAI combination and the PVS address, etc.) to the UE.

Figure 10:
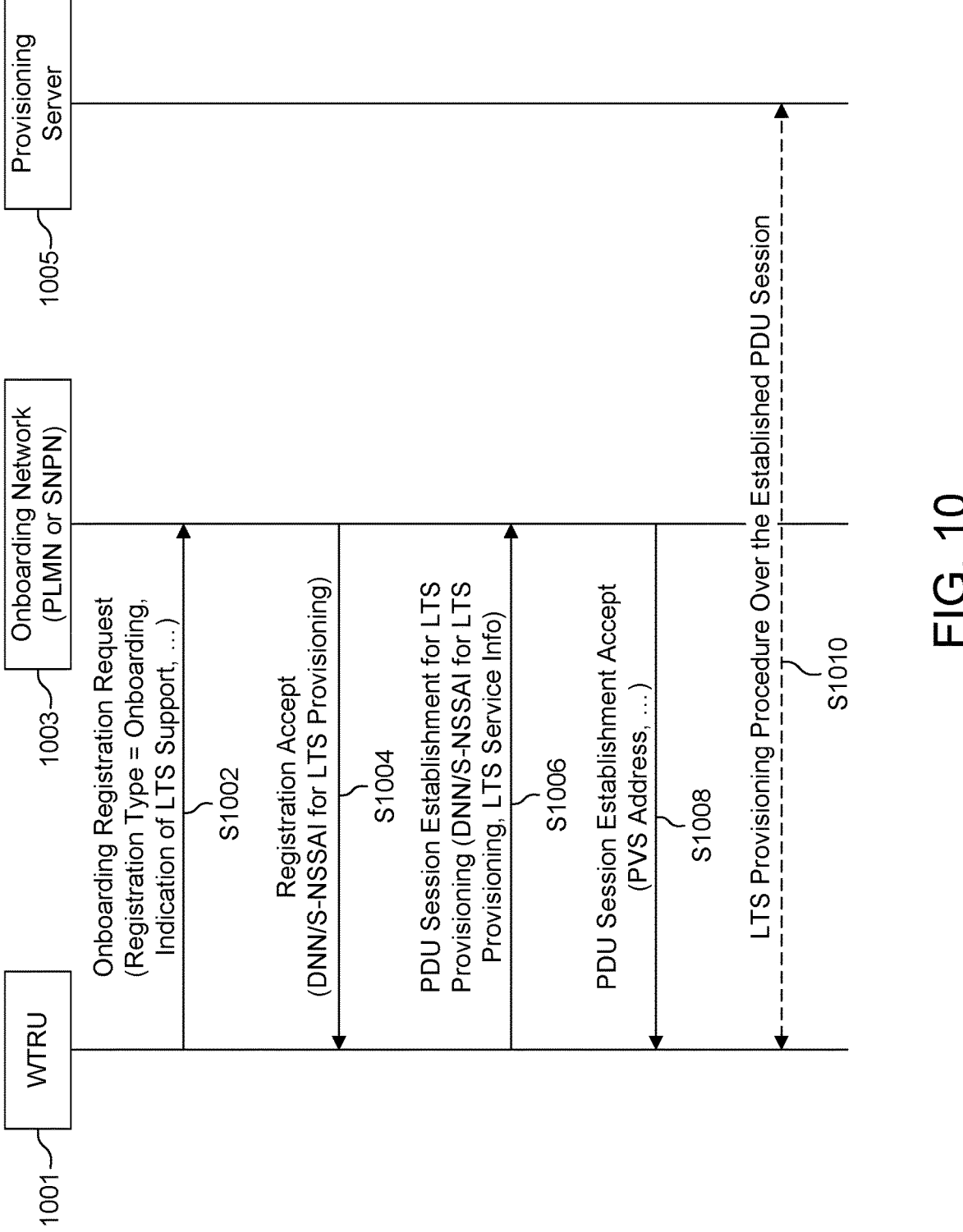
FIG. 10 is a signal flow diagram illustrating a process for remote provisioning of a UE in accordance with an exemplary embodiment.

FIG. 10 is a signal flow diagram illustrating an exemplary process for remote provisioning of a UE in accordance with the principles discussed above. In step S1002, when the UE 1001 registers with the onboarding network 1003 (e.g., a PLMN or SNPN), it includes, in the onboarding registration request, its LTS service capability. In response, in step S1004, the network 1003 returns a Registration Accept message that includes a configuration of DNN/S-NSSAI combination for LTE network remote provisioning.

Later, when it is desired to join a LTS network, in step S1006, the UE 1001 initiates a PDU Session Establishment in the onboarding network 1003 for remote provisioning for the target LTS network. In the PDU Session Establishment request message, the UE may use the previously received DNN/S-NSSAI combination. It may also include in the PDU Session Establishment request message an explicit indication that the PDU Session is requested for remote provisioning for LTS networks and/or additional target LTS service or network information, such as the target LTS service identifier or name, the target LTS hosting network identifier or name, etc.), which information it may have acquired this additional service information through LTS service advertisement. Using the target LTS service information provided by the UE, the network 1003 identifies the corresponding remote provisioning configuration (e.g., PVS address) and, in step S1008, returns it to the UE in a PDU Session Establishment Accept message (or, alternately, a UE Configuration Update message). The UE 1001 may now, as shown in step S1010, use the established PDU Session and the received configuration (e.g., PVS address) to access the provisioning server of the target LTS network for retrieving LTS network credentials and other information for selecting and accessing the target LTS network.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, MME, EPC, AMF, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the various embodiments have been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown.

Rather, various modifications may be made in the details within the scope and range of equivalents of the claims and without departing from the invention.

REFERENCES

The following references may have been referred to hereinabove and are incorporated herein by reference in their entirety.

[1] 3GPP S1-203276, "Study on 5G Networks Providing Access to Localized Services"
[2] 3GPP TS 23.501, "System Architecture for the 5G System", V17.1.1, 2021-06
[3] 3GPP TS 23.502, "Procedures for the 5G System", V17.1.0, 2021-06
[4] 3GPP TS 23.122, "Non-Access-Stratum (NAS) functions related to Mobile Station (MS) in idle mode", V16.7.0, 2020-09
[5] 3GPP TS 23.273, "5G System (5GS) Location Services (LCS);", V16.4.0, 2020-07
[6] 3GPP TS 23.246 'Multimedia Broadcast/Multicast Service (MBMS); Architecture and functional description", V16.1.0

What is claimed:

1. A method, implemented in a wireless transmit/receive unit, WTRU, of provisioning the WTRU for communication in a temporary local network, the method comprising:
transmitting, to an onboarding network, information indicative of a capability of the WTRU to communicate with the temporary local network;
transmitting, to the onboarding network, at least one identifier of a service;
receiving, from the onboarding network, provisioning configuration information for temporary local network provisioning, wherein the provisioning configuration information comprises a provisioning server address for the service;
receiving, from the onboarding network, using the received provisioning configuration information, a message identifying a provisioning configuration for use by the WTRU with the temporary local network; and
sending a message, using the provisioning configuration information, to the temporary local network.

2. The method of claim 1, wherein the temporary local network is a Localized Temporary Service, LTS, network.

3. The method of claim 1, wherein transmitting, to the onboarding network, information regarding the capability comprises transmitting a registration request including the information regarding the capability.

4. The method of claim 1, wherein the configuration information is for a data network and a network slice.

5. The method of claim 1, further comprising:
establishing a session in the temporary local network and retrieving credentials for use in the temporary local network from a provisioning server of the temporary local network, the provisioning server accessed using the session and the provisioning configuration.

6. A wireless transmit/receive unit, WTRU, comprising:
memory configured to store program code instructions; and
at least one processor configured to execute the program code instructions to:
transmit, to an onboarding network, information indicative of a capability of the WTRU to communicate with a temporary local network;

transmit, to the onboarding network, at least one identifier of a service;

receive, from the onboarding network, provisioning configuration information for temporary local network provisioning, wherein the provisioning configuration information comprises a provisioning server address for the service;

receive, from the onboarding network, using the received provisioning configuration information, a message identifying a provisioning configuration for use by the WTRU with the temporary local network; and send a message, using the provisioning configuration information, to the temporary local network.

7. The WTRU of claim 6, wherein the temporary local network is a Localized Temporary Service, LTS, network.

8. The WTRU of claim 6, wherein transmit, to the onboarding network, information regarding the capability comprises transmit a registration request including the information regarding the capability.

9. The WTRU of claim 6, wherein the configuration information is for a data network and a network slice.

10. The WTRU of claim 6, wherein the at least one processor is further configured to establish a session in the temporary local network and retrieve receive credentials for use in the temporary local network from a provisioning server of the temporary local network, the provisioning server accessed using the session and the provisioning configuration.

* * * * *